(12) United States Patent
Inagaki

(10) Patent No.: US 10,114,583 B2
(45) Date of Patent: Oct. 30, 2018

(54) STORAGE SYSTEM, STORAGE MANAGEMENT METHOD, AND STORAGE MEDIUM

(71) Applicant: NEC Corporation, Minato-ku, Tokyo (JP)

(72) Inventor: Tomokazu Inagaki, Tokyo (JP)

(73) Assignee: NEC CORPORATION, Tokyo (JP)

( * ) Notice: Subject to any disclaimer, the term of this patent is extended or adjusted under 35 U.S.C. 154(b) by 71 days.

(21) Appl. No.: 15/060,842

(22) Filed: Mar. 4, 2016

(65) Prior Publication Data
US 2016/0283162 A1   Sep. 29, 2016

(30) Foreign Application Priority Data
Mar. 24, 2015  (JP) .................. 2015-060431

(51) Int. Cl.
  *G06F 12/00*  (2006.01)
  *G06F 3/06*  (2006.01)
(52) U.S. Cl.
  CPC .......... *G06F 3/0652* (2013.01); *G06F 3/0608* (2013.01); *G06F 3/0673* (2013.01); *G06F 3/0689* (2013.01)
(58) Field of Classification Search
  CPC .... G06F 3/0652; G06F 3/0608; G06F 3/0673; G06F 3/0689
  See application file for complete search history.

(56) References Cited

U.S. PATENT DOCUMENTS

| 2009/0254507 A1 | 10/2009 | Hosoya et al. |
| 2010/0042790 A1* | 2/2010 | Mondal ................. G06F 3/0608 711/161 |
| 2011/0167221 A1* | 7/2011 | Pangal ................ G06F 11/1453 711/117 |

(Continued)

FOREIGN PATENT DOCUMENTS

| JP | 2006-011811 A | 1/2006 |
| JP | 2007-310861 A | 11/2007 |

(Continued)

OTHER PUBLICATIONS

Communication dated May 30, 2017, issued from the Japan Patent Office in counterpart Application No. 2015-060431.

(Continued)

*Primary Examiner* — Prasith Thammavong

(57) ABSTRACT

Provided is a storage system (1200) including a first volume providing a storage area, a second volume providing another storage area including a difference from the first volume, and a volume management unit releasing an area allocated to a second specific partial storage area in a storage area in a storage device allocated to the second volume when accepting a delete request for specific data, in accordance with a result of confirmation of sameness between data included in the second specific partial storage area and data included in a first specific partial storage area. The second specific partial storage area is a partial storage area in the second volume including the specific data. The first specific partial storage area is a partial storage area in the first volume and associated with the second specific partial storage area.

10 Claims, 14 Drawing Sheets

(56) References Cited

U.S. PATENT DOCUMENTS

| | | | | |
|---|---|---|---|---|
| 2012/0330905 A1* | 12/2012 | Artishdad | ........... | G06F 21/6218 |
| | | | | 707/692 |
| 2013/0007732 A1* | 1/2013 | Fries | ................... | G06F 9/45558 |
| | | | | 718/1 |
| 2013/0054919 A1* | 2/2013 | Auvenshine | .......... | G06F 3/0608 |
| | | | | 711/165 |
| 2013/0061013 A1* | 3/2013 | Tokoro | ................ | G06F 11/1076 |
| | | | | 711/162 |
| 2014/0007239 A1* | 1/2014 | Sharpe | .................. | G06F 21/561 |
| | | | | 726/24 |
| 2015/0261792 A1* | 9/2015 | Attarde | ............. | G06F 17/30303 |
| | | | | 707/616 |
| 2016/0283162 A1* | 9/2016 | Inagaki | ................. | G06F 3/0652 |

FOREIGN PATENT DOCUMENTS

| | | |
|---|---|---|
| JP | 2008-158570 A | 7/2008 |
| JP | 2009-251725 A | 10/2009 |
| JP | 2011-248742 A | 12/2011 |
| JP | 2013-054416 | 3/2013 |
| JP | 2014-032515 | 2/2014 |
| JP | 2014-191405 A | 10/2014 |

OTHER PUBLICATIONS

Xu, J., et al. "A lightweight virtual machine image deduplication backup approach in cloud environment," 2014 IEEE 38th Annual Computer Software and Applications Conference, US, IEEE Conference Publications, 2014, pp. 503-508 (6 pages total).

Akifumi, M., et al. "Virtual desktop solution supporting virtual workspace in Netmarks," Unisys Technology Review Extra Edition (116), vol. 33, No. 1, May 31, 2013, pp. 7-19 (13 pages total).

\* cited by examiner

Fig. 4

ENTITY-VOLUME-DIFFERENCE MANAGEMENT TABLE 201a

ENTITY VOLUME 000

| DIFFERENCE AREA ID 401 | RANGE INFORMATION 402 | DIFFERENCE DATA CHECK CODE 403 |
|---|---|---|
| 0000 | Start LBA : 00000000 – END LBA : 00007FFF | ******** |
| 0001 | Start LBA : 00008000 – END LBA : 0000FFFF | ******** |
| 0002 | Start LBA : 00010000 – END LBA : 00017FFF | ******** |
| ... | ... | ... |
| xxxx | Start LBA : XXXXXXXX – END LBA : XXXXXXXX | ******** |

CLONE-VOLUME-DIFFERENCE MANAGEMENT TABLE 201b

CLONE VOLUME 001

| DIFFERENCE AREA ID 501 | RANGE INFORMATION 502 | DIFFERENCE VALIDITY FLAG 503 | DIFFERENCE-DATA-CHECK REQUEST FLAG 504 |
|---|---|---|---|
| 0000 | Start LBA : 00000000 – END LBA : 00007FFF | 1 (VALID) | 0 |
| 0001 | Start LBA : 00008000 – END LBA : 0000FFFF | 0 (INVALID) | 0 |
| 0002 | Start LBA : 00010000 – END LBA : 00017FFF | 0 | 0 |
| ... | ... | ... | ... |
| xxxx | Start LBA : XXXXXXXX – END LBA : XXXXXXXX | 0 | 0 |

CLONE VOLUME 002

| DIFFERENCE AREA ID | RANGE INFORMATION | DIFFERENCE VALIDITY FLAG | DIFFERENCE-DATA-CHECK REQUEST FLAG |
|---|---|---|---|
| 0000 | Start LBA : 00000000 – END LBA : 00007FFF | 1 | 0 |
| 0001 | Start LBA : 00008000 – END LBA : 0000FFFF | 0 | 0 |
| 0002 | Start LBA : 00010000 – END LBA : 00017FFF | 1 | 0 |
| ... | ... | ... | ... |
| xxxx | Start LBA : XXXXXXXX – END LBA : XXXXXXXX | 0 | 0 |

...

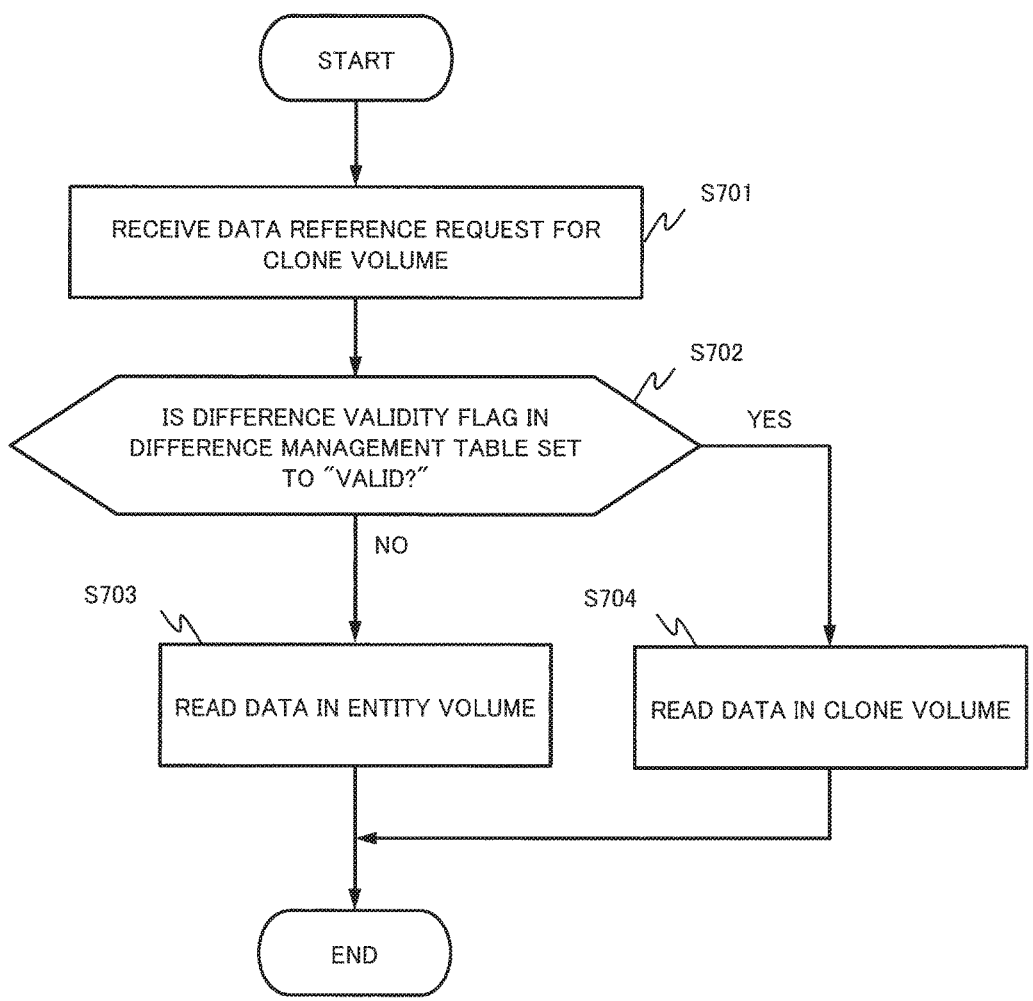

STORAGE SYSTEM, STORAGE MANAGEMENT METHOD, AND STORAGE MEDIUM

This application is based upon and claims the benefit of priority from Japanese Patent Application No. 2015-060431, filed on Mar. 24, 2015, the disclosure of which is incorporated herein in its entirety by reference.

TECHNICAL FIELD

The present invention relates to a storage system, and the like, capable of efficiently utilizing a storage area.

BACKGROUND ART

Technologies about efficient use of storage capacity are disclosed in, for example, following patent literatures.

Japanese Unexamined Patent Application Publication No. 2011-248742 (hereinafter referred to as PTL 1) discloses a technology of reducing storage capacity used by a virtual machine. The technology disclosed in PTL 1 extracts a difference between a disk image used by an existing virtual machine and a master disk image used as a master. The technology disclosed in PTL 1 replaces the disk image of the virtual machine by a difference disk image storing the difference.

Japanese Unexamined Patent Application Publication No. 2013-054416 (hereinafter referred to as PTL 2) discloses a technology of reducing physical storage capacity needed for a copy destination of backup data. For each partial area included in a data area in a copy source, the technology disclosed in PTL 2 generates and stores a code used to determine the sameness of data included in the areas. When copying partial areas that store the identical data to data areas in a copy destination, the technology disclosed in PTL 2 assigns an identical physical storage area to the respective partial areas.

Japanese Unexamined Patent Application Publication No. 2006-011811 (hereinafter referred to as PTL 3) discloses a technology of excluding unnecessary data from a managed object in a storage system connected to a host apparatus. The storage system disclosed in PTL 3 includes a primary volume and a difference volume that accumulates differences from the primary volume. The technology specifies a storage area in the primary volume, which is associated with an area not referenced in a file system in the host apparatus. Then, the technology deletes a storage area, in the difference volume, which is associated with the specified storage area in the primary volume.

A technology related to management, operation, and the like of a storage system is disclosed in following patent literatures. These technologies are not directly related to efficient use of storage capacity.

For example, Japanese Unexamined Patent Application Publication No. 2014-032515 (hereinafter referred to as PTL 4) discloses a technology, applied in a storage system which duplicates data via a network, to release part of a storage area including copy target data, while the data are in duplication process.

For example, Japanese Unexamined Patent Application Publication No. 2008-158570 (hereinafter referred to as PTL 5) discloses a technology applied for a storage apparatuses. By the technology, a plurality of storage apparatuses verify sameness of data stored in the respective apparatuses, by generating and interchanging a check code for data stored in the respective local apparatuses. Thus, the technology disclosed in PTL 5 reduces transfer of identical data.

SUMMARY

A main object of the present invention is to provide a storage system and the like capable of efficiently utilizing a storage area by removing redundantly stored data.

To achieve the object, a storage system according to one aspect of the present invention includes: a first volume configured to provide a storage area; a second volume configured to provide another storage area including a difference from the first volume; and a volume management unit configured to release an area allocated to a second specific partial storage area in a storage area in a storage device allocated to the second volume when accepting a delete request for specific data, based at least in part on a result of confirmation of sameness between data included in the second specific partial storage and data included in a first specific partial storage area, the second specific partial storage area being a partial storage area in the second volume including the specific data, the first specific partial storage area being a partial storage area in the first volume and being associated with the second specific partial storage area.

To achieve the object, a storage management method according to another aspect of the present invention includes: accepting a delete request for specific data included in a storage including a first volume providing a storage area and a second volume providing a storage area including a difference from the first volume; and releasing an area allocated to a second specific partial storage area in a storage area in a storage device allocated to the second volume, based at least in part on a result of confirmation of sameness between data included in the second specific partial storage area and data included in a first specific partial storage area, the second specific partial storage area being a partial storage area in the second volume including the specific data, the first specific partial storage area being a partial storage area in the first volume and being associated with the second specific partial area.

The object is also achieved by a computer program or a computer-readable recording medium storing the computer program, and the like, which realizes a storage system including the aforementioned configuration or a storage setting method, by utilizing a computer.

BRIEF DESCRIPTION OF THE DRAWINGS

FIG. 4 is an explanatory diagram illustrating a configuration example of management information (an entity-volume-difference management table) used in the storage system according to the first exemplary embodiment of the present invention.

FIG. 5 is an explanatory diagram illustrating a configuration example of management information (a clone-volume-difference management table) used in the storage system according to the first exemplary embodiment of the present invention.

FIG. 7 is a flowchart exemplifying an operation (data reference process) of the storage system according to the first exemplary embodiment of the present invention.

EXEMPLARY EMBODIMENT

Figure 1:
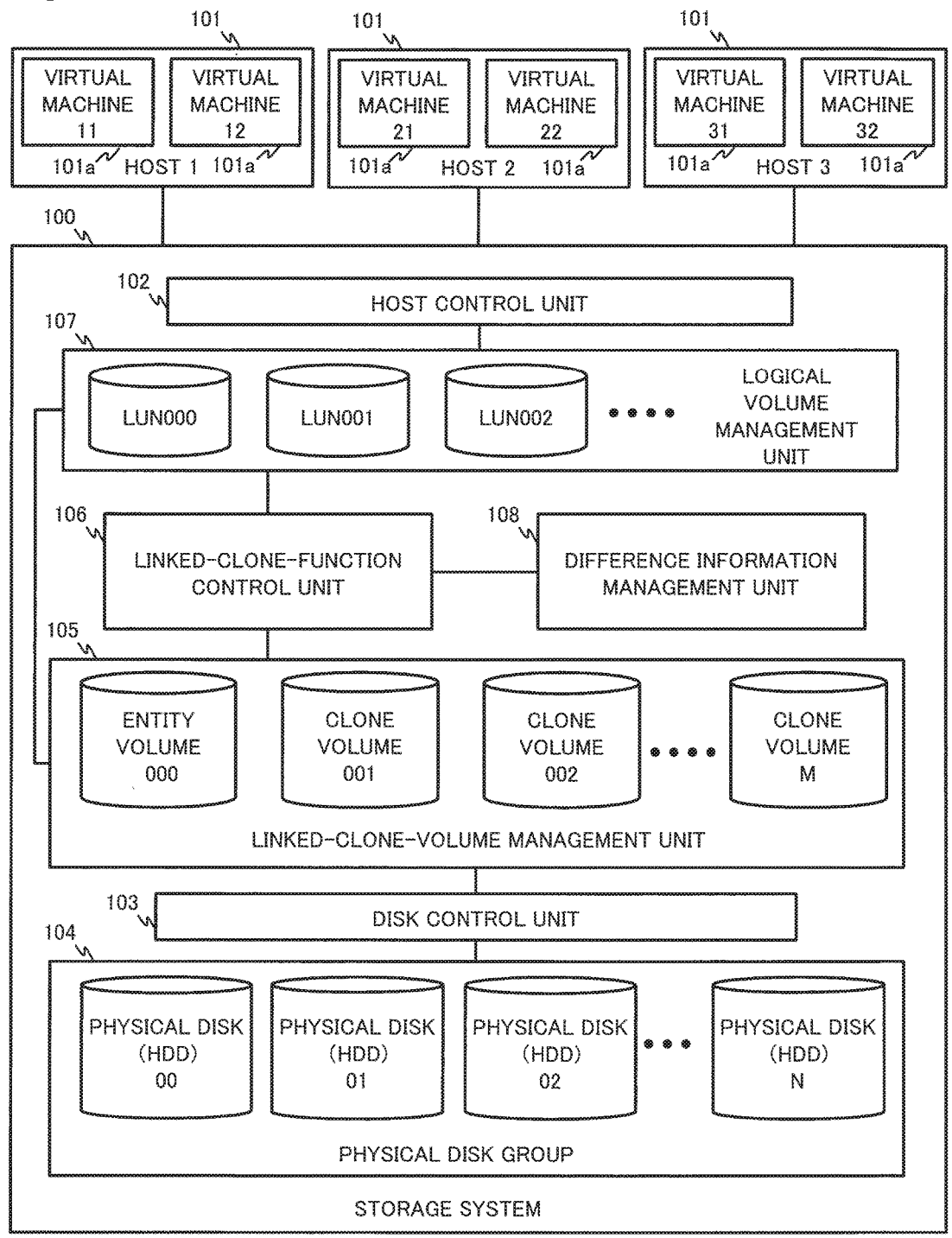
FIG. 1 is a block diagram exemplifying a functional configuration of a storage system according to a first exemplary embodiment of the present invention.

Exemplary embodiments of the present invention will be described in detail with reference to the drawings. A configuration illustrated in each exemplary embodiment below is an example, and the technical scope of the present invention is not limited thereto.

First, prior to description about each exemplary embodiment of the present invention, a technical background related to the present invention and the like will be described to facilitate understanding of the present invention.

A technology called as a linked clone function is known as one of technologies for virtualizing a storage system (or a storage apparatus). A storage system equipped with the linked clone function provides a virtual storage (storage area) by use of a volume (storage area) called a clone volume and a volume called an entity volume. The clone volume is a volume storing (including), for example, data individually used in each virtual machine. The entity volume is a volume storing, for example, data commonly used (sharable) for each virtual machine.

More specifically, in a storage system equipped with the linked clone function, data (difference data) representing a difference between each clone volume and the entity volume are stored in a physical disk. Such a physical disk is a storage apparatus including an appropriate storage device such as a hard disk drive (HDD) or a semiconductor storage apparatus. In the storage system, the difference data described above are stored in a storage area (storage capacity) allocated in the physical disk.

In the storage system providing the linked clone function, the entity volume storing master data and the clone volume used by each virtual machine are respectively configured with a plurality of partial areas. Such a partial area may be defined by use of, for example, a specific address range (such as addresses determined with logical block addressing (LBA)).

In the storage system providing the linked clone function, a partial area in the clone volume is associated with a partial area in the entity volume. For example, a partial area in the entity volume and a partial area in the clone volume may be associated each other for each specific address range of respective partial area. The storage system manages a difference between the clone volume used by each virtual machine and the entity volume as master data, with respect to each partial area of the clone volumes.

The storage system providing the linked clone function provides data stored in the clone volume or the entity volume in response to an access request from a host apparatus (such as a virtual machine or an information processing apparatus executing a virtual machine). More specifically, in a case that there is no difference between the clone volume and the entity volume, when a host apparatus refers to data in the clone volume, data in the entity volume are referred. For example, when the host apparatus refers to data stored in a specific storage area in the clone volume, a storage area in the entity volume associated with the specific storage area of the clone volume is specified. Then, data included in the specified storage area in the entity volume are provided to the host apparatus.

When a write process is performed on the clone volume by the host apparatus, the difference between the entity volume and the clone volume occurs. In this case, for example, the storage system writes, into a physical disk, the difference between a partial area in the clone volume on which the write process is performed and a partial area in the entity volume associated with the partial area. Then, the storage system sets information (such as a flag) indicating the difference in the partial area to management information (such as a management table indicating existence or non-existence of a difference for each partial area, ro a difference map). From this point forward, an access to the partial area with such a difference is directed to the data on which the write process is performed (that is, data written to the clone volume and stored in the physical disk).

The storage system providing the linked clone function controls in such a way that data stored in a physical disk is limited to difference data between the entity volume and the clone volume. Consequently, such the storage system is capable of reducing capacity (a storage area) of the physical disk in use, even when many virtual machines are created, compared with a case that whole of the data of each virtual machine are stored in the physical disk. In other words, the storage system need not to redundantly store data in the entity volume, which is common to each virtual machine, into the physical disk, for each virtual machine. Thus, the storage system is capable of reducing storage capacity of the physical disk in use.

There is a case, that a specific partial area in the clone volume and a specific partial area in the entity volume respectively store identical data, such as, for example, when updated data are deleted in the clone volume. In other words, for these partial areas, identical data are redundantly stored in a physical disk, and therefore a storage area in the physical disk is unnecessarily consumed. When operation of the storage system continues and creation and deletion of files are repeated in a virtual machine, there is a possibility that a plurality of storage areas including identical data (that is, storing identical data) in a physical disk are allocated redundantly. When redundant storage areas including identical data as described above in the physical disk can be reduced, the storage areas may be used more efficiently.

The present invention to be explained by use of each exemplary embodiment below is able to provide a storage system and the like, that is capable of managing efficiently physical disk capacity by reducing unnecessary data among difference data between the clone volume and the entity volume.

The storage system described in each exemplary embodiment below may be implemented with one or more dedicated hardware apparatuses, or a general-purpose hardware apparatus such as a computer. The storage system according to each exemplary embodiment below may be implemented as a stand-alone apparatus (storage apparatus), or may be implemented as a system configured with a plurality of hardware apparatuses. A hardware configuration example (such as FIG. 13) capable of providing such a storage system will be described later.

First Exemplary Embodiment

A first exemplary embodiment of the present invention will be described with reference to the drawings.

(Configuration)

FIG. 1 is a block diagram exemplifying a functional configuration of a storage system 100 according to the present exemplary embodiment. The storage system 100 according to the present exemplary embodiment is connected to one or more host apparatuses (101 in FIG. 1). The storage system 100 receives various commands from the host apparatus 101 and performs various processes, in accordance with the commands. While hosts 1 to 3 are exemplary illustrated in FIG. 1, the number of hosts that may connect to the storage system may be appropriately determined.

A virtual machine 101a is arranged in each host apparatus 101. In a specific example illustrated in FIG. 1, two virtual machines 101a are respectively arranged for each host apparatus 101. More than one virtual machines may be arranged for each host apparatus 101. The virtual machine 101a and an execution environment (virtualization base) of the virtual machine 101a can be implemented by use of a known virtualization technology, and therefore detail description thereof is omitted.

The storage system 100 mainly includes a host control unit 102, a disk control unit 103, a linked-clone-volume management unit 105, a linked-clone-function control unit 106, a logical volume management unit 107, and a difference information management unit 108. The storage system 100 may further include a physical disk group 104. These components constituting the storage system 100 may be communicably connected by use of an appropriate communication method. Each component constituting the storage system 100 will be described below.

The storage system 100 includes the host control unit 102 receiving various commands from the host apparatus 101. The host control unit 102 analyzes commands received from each host apparatus 101 and determines a process to be performed for each command. Such a command may be, for example, a command executing various types of access to a storage. The command may be, for example, a command defined by the Small Computer System Interface (SCSI) standards. The command is not limited to the description above.

Further, the storage system 100 includes the disk control unit 103 controlling the physical disk group 104. A physical disk, that constitutes the physical disk group 104, is a storage apparatus including a physical storage device such as a HDD or a semiconductor storage apparatus. The physical disk group 104 may be implemented inside the storage system 100 as exemplified in FIG. 1. Further, the physical disk group 104 may be implemented outside the storage system 100 and may be connected to the storage system 100. The number of physical disks (for example, physical disks "00" to "N" in FIG. 1) constituting the physical disk group 104 may be appropriately determined. Data included (stored) in an entity volume or a clone volume managed by the linked-clone-volume management unit 105 (described later) are respectively stored in an associated storage area (physical storage area) in a physical disk. The disk control unit 103 controls allocation and release of a storage area with respect to the physical disk group 104, and various types of access (such as referencing, updating, and deleting) with respect to an allocated storage area. When releasing the storage area in the physical disk group 104, the disk control unit 103 is able to write a specific value (such as "0") into the released storage area.

Further, the storage system 100 includes the linked-clone-volume management unit 105. The linked-clone-volume management unit 105 allocates a storage area (physical storage area) for storing data from the physical disk group 104 through the disk control unit 103. Then, the linked-clone-volume management unit 105 configures an entity volume (may also be referred to as a "first volume") or a clone volume (may also be referred to as a "second volume") by use of the allocated physical storage area described above. The linked-clone-volume management unit 105 may execute, for example, various access processes on the entity volume or the clone volume. The linked-clone-volume management unit 105 may configure an appropriate number of entity volumes or clone volumes, according to the number of the host apparatuses 101 and virtual machines 101a, and the like.

Further, the storage system 100 includes the linked-clone-function control unit 106. The linked-clone-function control unit 106 provides, for the logical volume management unit 107 (described later), a logical unit number (LUN) being used to identify a logical storage volume, on the basis at least in part of the entity volume and the clone volume, configured by the linked-clone-volume management unit 105. For example, the host apparatus 101 (virtual machine 101a) recognizes one logical storage device (logical volume) for each LUN. The virtual machine 101a accesses a logical volume provided for each LUN.

Figure 3:
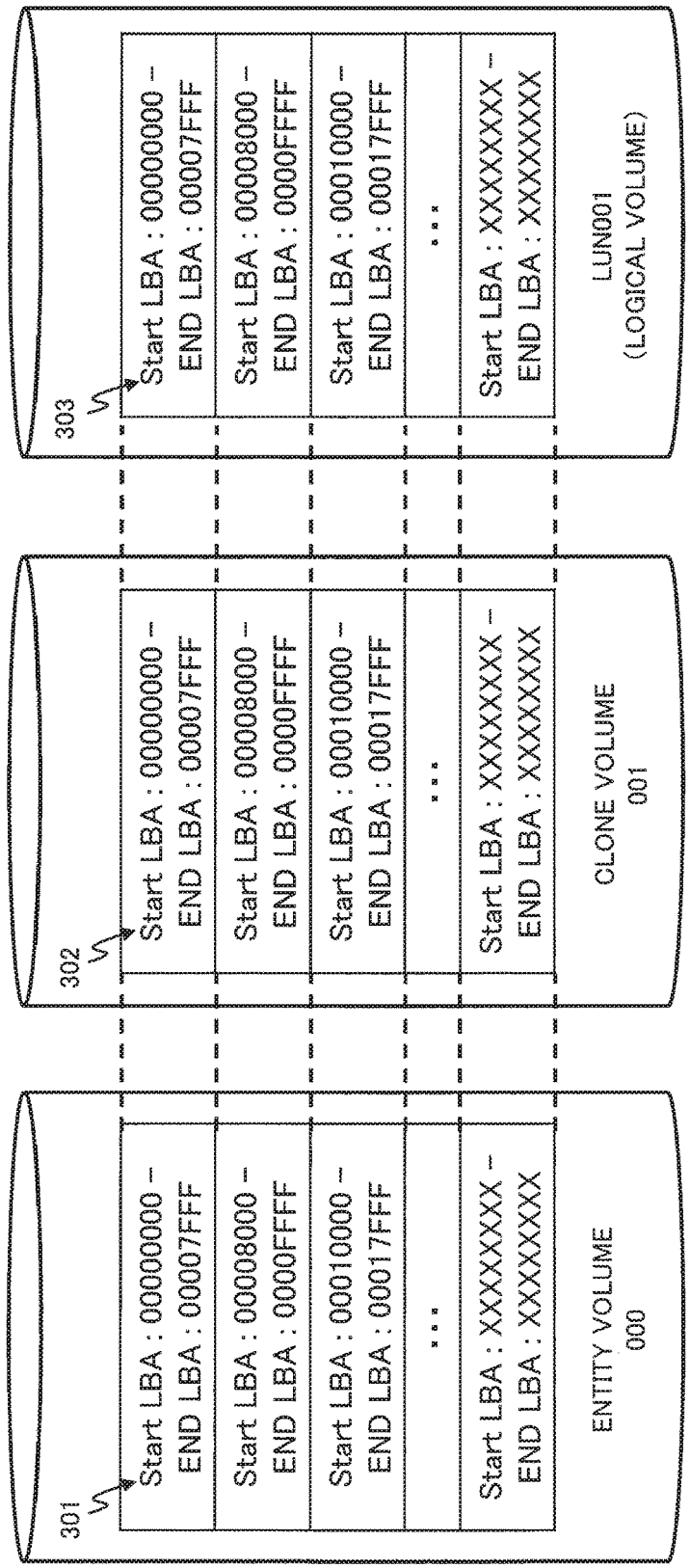
FIG. 3 is an explanatory diagram schematically illustrating a relation between storage areas according to the first exemplary embodiment of the present invention.

The linked-clone-function control unit 106 and the logical volume management unit 107 (described later) may, for example, link the entity volume, a the clone volume, and the logical volume for each specific partial area, as exemplified in FIG. 3. In this case, a partial area in each of the volumes is associated with a partial area in another volume. For example, when the host apparatus 101 (virtual machine 101a) accesses data included (stored) in the specific area in a logical volume, data in an area, that associated with the specific area, in the clone volume or the entity volume are accessed. The partial area in each of the aforementioned volumes may be partitioned at every certain address range as exemplified in FIG. 3. The respective volumes may be associated with each other by use of, for example, an identifying information (ID of identifier) that can be uses to identify the partial area in each volume, or the like. An associated partial area in each volume may be hereinafter referred to as a "relevant area (related area)" or a "relevant partial area (related partial area)." For example, in the case of a specific example illustrated in FIG. 3, an area in the "clone volume 001" (302 in FIG. 3) may be referred to as a "relevant area (related area)" with respect to an area in the "entity volume 000" (301 in FIG. 3). Similarly the area in the "entity volume 000" (301 in FIG. 3) may be referred to as a "relevant area (related area)" with respect to an area in the "clone volume 001" (302 in FIG. 3). Relevant areas (relevant partial areas) in respective volumes may, for example, be partial areas having the same address range, or be partial areas assigned with a same identifier.

Figure 2:
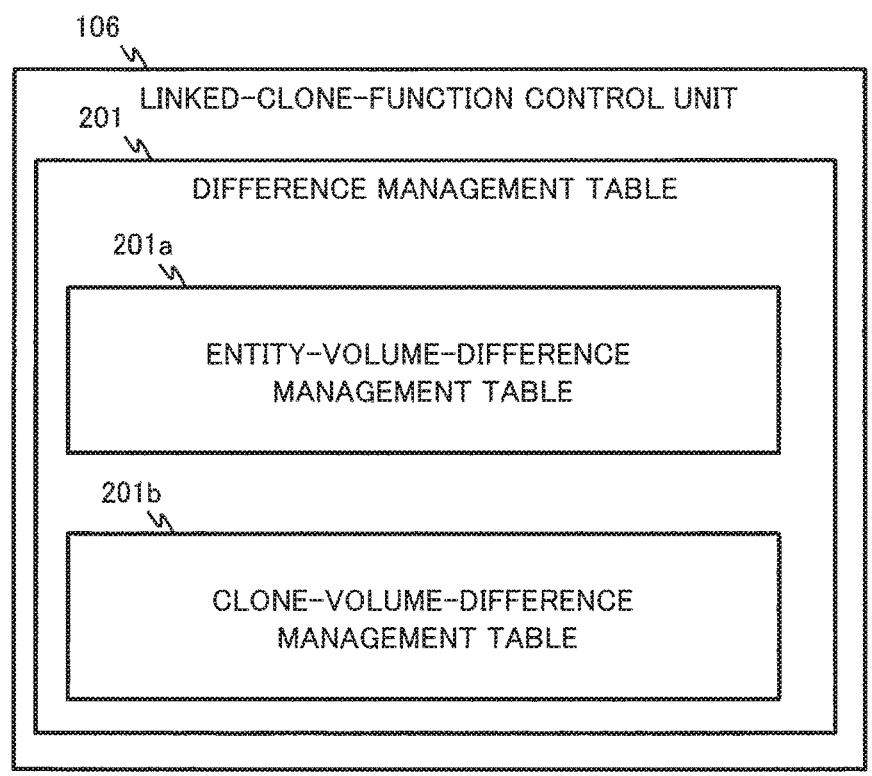
FIG. 2 is a block diagram exemplifying a functional configuration of a component (linked-clone-function control unit) of the storage system according to the first exemplary embodiment of the present invention.

The linked-clone-function control unit 106 includes a difference management table 201, as exemplified in FIG. 2. The difference management table 201 includes an entity-volume-difference management table 201a (may also be referred to as a "first volume management information") including information related to the entity volume. The difference management table 201 also includes a clone-volume-difference management table 201b (may also be referred to as a "second volume management information") including information related to the clone volume.

The entity-volume-difference management table 201a includes a difference area ID 401, range information 402 and a difference data check code 403 in such a way that they are associated with each other for each entity volume, as exemplified in FIG. 4.

The difference area ID 401 is, for example, an identifier that can be used for identifying (specifying) a difference area, that is a partial area constituting the entity volume. The entity-volume-difference management table 201a may not include the difference area ID 401.

The range information 402 is, for example, information indicating a range of a storage area constituting a specific difference area. The range information 402 is, for example, information indicating an address range constituting the specific difference area. In this case, the range information 402 may include, for example, a start LBA and an end LBA of the address range for each difference area. Information included in the range information 402 is not limited to the address range. The range information 402 may include, for example, the number of blocks constituting the specific difference area and an offset from the start of the storage.

The difference data check code 403 is a code that enables to determine of whether or not data held in the specific difference area are identical to other data. Such a check code may be, for example, a hash value calculated from data included in the specific difference area. Such the hash value can be calculated by use of a known technology such as the Message Digest Algorithm 5 (MD5) or the Secure Hash Algorithm (SHA).

The entity-volume-difference management table 201a may also include, for example, information that can be used to specify the storage area (physical storage area), that is allocated to the difference area included in the entity volume, in the physical disk group 104, in addition to the information described above.

The clone-volume-difference management table 201b includes a difference area ID 501 associated with range information 502, a difference validity flag 503, and a difference-data-check request flag 504, for each clone volume as exemplified in FIG. 5.

The difference area ID 501 is an identifier that can be used for identification (specification) of a difference area, that is a partial area constituting the clone volume. The difference area ID 501 may be configured similarly to the difference area ID 401 in FIG. 4. A difference area in the entity volume and a difference area in the clone volume may be associated by use of the difference area ID 401 and the difference area ID 501.

The range information 502 is information indicating a range of a storage area constituting a specific difference area. The range information 502 indicates, for example, an address range constituting the specific difference area. In this case, the range information 502 may include a start LBA and an end LBA of the address range for each difference range. The range information 502 may be configured similarly to the range information 402 in FIG. 4.

The difference validity flag 503 is information indicating whether or not the difference area in the clone volume is updated from a relevant area in an entity volume associated with the difference area. The difference validity flag may be hereinafter referred to as "difference validity information." The difference validity flag 503 may alternatively indicate whether or not a difference has occurred between data stored in the difference area in the clone volume and data stored in the relevant area in the entity volume. In a specific example illustrated in FIG. 5, in a case that the difference validity flag is set to "1" (valid), the data stored in difference area in the clone volume has been updated (a difference exists). And in a case that the difference validity flag is set to "0" (invalid), data stored in the difference area in the clone volume is not updated (a difference does not exist). In the specific example illustrated in FIG. 5, the difference validity flag associated with the difference area of which difference area ID "0000" is set to "1." In this case, it is indicated that data stored in the difference area "0000" in the clone volume are updated from data stored in the difference area "0000" in the entity volume. A process about the difference validity flag will be described later.

The difference-data-check request flag 504 is information indicating whether or not to execute a process of confirming existence of a difference between the difference area in the clone volume and the relevant area in the entity volume associated with the difference area. That is, the difference-data-check request flag 504 is information indicating whether or not to execute a process of determining whether data stored in a specific difference area in a clone volume and data stored in a relevant area in an entity volume are identical or not. The difference-data-check request flag 504 may be hereinafter referred to as "difference check request information."

When accepting a delete request for data in a clone volume, the linked-clone-function control unit 106 according to the present exemplary embodiment sets the difference-data-check request flag 504 associated with a difference area including the data. A process about to the difference-data-check request flag 504 will be described later.

The clone-volume-difference management table 201b may include, for example, information that can be used for specifying a storage area (physical storage area), in the physical disk group 104, that is allocated to the difference area included in the clone volume, in addition to the information described above.

The storage system 100 includes the logical volume management unit 107. The logical volume management unit 107 provides, for each host apparatus 101, a logical volume assigned with an LUN, through the host control unit 102. The logical volume management unit 107 accepts, from each host apparatus 101, various commands for the logical volume. The logical volume management unit 107 may analyze the accepted command, and request the linkedclone-volume management unit 105 to execute various access processes on the entity volume or the clone volume.

The storage system 100 includes the difference information management unit 108. The difference information management unit 108 monitors the linked-clone-function control unit 106. More specifically, the difference information management unit 108 may observe a state of difference information held by the linked-clone-function control unit 106 (contents of the difference management table 201). The difference information management unit 108 includes a difference data comparison unit 601, a check code generation unit 602, and a difference data release unit 603 as exemplary illustrated in FIG. 6.

The difference data comparison unit 601 observes the difference-data-check request flag (504 in FIG. 5) in the clone-volume-difference management table 201b, and, when the flag is set to be "valid", requests the check code generation unit 602 to compare data.

The check code generation unit 602 generates a check code for each difference area in the entity volume. The check code generation unit 602 generates the check code for a difference area for which difference-data-check request flag is set to be "valid", in the clone volume.

The difference data comparison unit 601 compares a check code for the difference area in the clone volume with a check code for the relevant area in the entity volume, both codes being generated by the check code generation unit 602. When the both codes are of the same value (identical), the difference data comparison unit 601 executes a compare check process on whole of data included in the same difference area in the respective volumes. Such the compare check process is, for example, a process of comparing, on a per byte or per bit basis, data included in the difference area in the clone volume with data included in the relevant area, that is associated with the difference area, in the entity volume.

There may be a case that a same check code is generated (collision occurs) for different data depending on a check code generation method. For example, when calculating a hash of data as a check code for the data, there is a possibility that an identical hash value is calculated from different data (hash collision). In other words, in a case that source data is the same, identical check codes are generated from the source data, however, there is a case that an identical check code does not necessarily represent that source data of the check code is the same. When check codes for two difference areas are identical, the difference data comparison unit 601 further performs compare process on the whole of data included in the respective areas. Thus, the difference data comparison unit 601 is able to avoid an influence of collision and to determine sameness (identity) of the data. The check code generation unit 602 may notify the result of the compare check process to the difference data comparison unit 601 or the difference data release unit 603.

When the result of the compare check process indicates that data included in respective areas are identical, the difference data release unit 603 requests the disk control unit 103 to release a storage area in the physical disk group 104, that is allocated in the difference area in the clone volume for storing data. Also, when the result of the compare check process indicates that data included in respective areas are the same, the difference data release unit 603 sets the difference validity flag in the clone-volume-difference management table 201b to "invalid".

Figure 6:
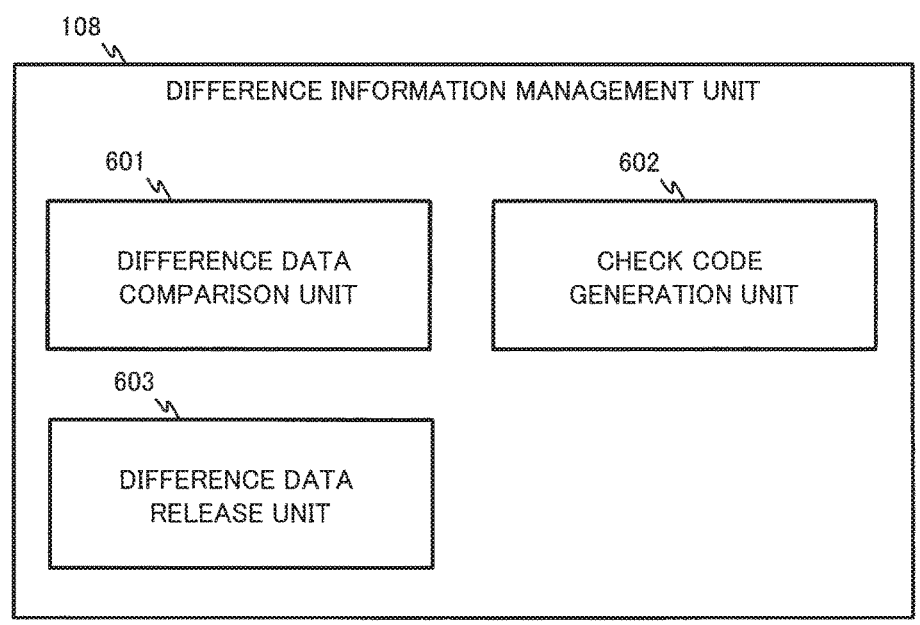
FIG. 6 is a block diagram exemplifying a functional configuration of a component (difference information management unit) of the storage system according to the first exemplary embodiment of the present invention.

The configuration of the storage system according to the present exemplary embodiment exemplified in FIGS. 1, 2, and 6 are merely one specific example and arrangement of each component can be appropriately changed. That is, the storage system 100 according to the present exemplary embodiment is not limited to the configuration exemplary illustrated in FIGS. 1, 2, and 6, and can be implemented with another configuration capable of providing a function similar to each component described above. For example, the linked-clone-volume management unit 105, the linked-clone-function control unit 106, the logical volume management unit 107, and the difference information management unit 108 in FIG. 1 may be implemented with a component integrating these units at least in a part, or in whole. Similarly, the difference data comparison unit 601, the check code generation unit 602, and the difference data release unit 603 exemplified in FIG. 6 may be implemented with a component integrating these units at least in part, or in whole.

(Description of Operation)

An operation of the storage system 100 according to the present exemplary embodiment, configured as described above, will be described.

As described above, the storage system 100 is connected to one or more host apparatuses 101. Further, one or more virtual machines 101a are arranged in each host apparatus 101. The storage system 100 provides a storage (logical volume) to each virtual machine 101a.

A process for providing the linked clone function in the storage system 100 will be described below.

To provide the linked clone function, the linked-clone-volume management unit 105 in the storage system 100 creates an entity volume. At this time, the linked-clone-volume management unit 105, for example, requests the disk control unit 103 to allocate (assign) disk capacity, that is required to create the entity volume, from the physical disk group 104. When the entity volume is created, the linked-clone-function control unit 106 may generate the entity-volume-difference management table 201a.

The host apparatus 101 writes various system data used by the virtual machine 101a into the entity volume created above. Such system data may be, for example, various data configuring a system (such as an operating system (OS) and various types of middleware) being common to a plurality of virtual machines 101a. An environment configuring a base for the virtual machine 101a is constructed by the system data written by the host apparatus 101.

After construction of the environment is completed, the difference information management unit 108 generates check code described above, for every difference area in the entity volume that is set in the entity-volume-difference management table 201a. The difference information management unit 108 may generate the check code by use of the check code generation unit 602. The difference information management unit 108 sets the generated check code to the difference data check code area (402 in FIG. 4) in the entity-volume-difference management table 201a. The difference information management unit 108 may notify a generated check code to the linked-clone-function control unit 106. In this case, the linked-clone-function control unit 106 may set the check code to the entity-volume-difference management table 201a.

The linked-clone-volume management unit 105 creates an initial clone volume for each virtual machine 101a. In an initial state, such the clone volume does not include a difference from the entity volume. When the clone volume is created, the linked-clone-function control unit 106 may generate the clone-volume-difference management table 201b.

In the following, a process performed when the host apparatus 101 (more specifically, virtual machine 101a) issues an access request to the storage system 100 capable of providing the linked clone function will be described.

A process to be executed when a data read (reference) request is notified from the virtual machine 101a to the storage system 100 will be described, with reference to a flowchart exemplified in FIG. 7.

The data read (reference) request is notified from the virtual machine 101a to the storage system 100 (Step S701). More specifically, for example, the virtual machine 101a notifies a reference request for specific data (or an area) in a logical volume provided by the logical volume management unit 107 to the host control unit 102. Such the reference request may be represented by, for example, a specific command. The host control unit 102, for example, analyzes the reference request, and requests reference (read) access to the specific data to the linked-clone-volume management unit 105. Specifically, the host control unit 102 requests, for example, reference access to an address area storing the specific data.

The linked-clone-volume management unit 105 refers the difference management table 201 (for example, the clone-volume-difference management table 201b) in the linked-clone-function control unit 106, and checks the difference validity flag (503 in FIG. 5) set for a difference area storing the specific data. Specifically, the linked-clone-volume management unit 105 determines whether or not the difference validity flag is set to "valid" (Step S702). For example, when a value "1" is set to the difference validity flag, the linked-clone-volume management unit 105 may determine that information indicating "valid" is set to the difference validity flag. Further, for example, when a value "0" is set to the difference validity flag, the linked-clone-volume management unit 105 may determine that information indicating "invalid" is set to the difference validity flag.

When the difference validity flag is set as "invalid" (NO in Step S702), the linked-clone-volume management unit 105 reads (refers) data from a storage area in the physical disk group 104 allocated to the entity volume (Step S703).

On the other hand, when the difference validity flag is set to "valid" (YES in Step S702), the linked-clone-volume management unit 105 reads (refers) data from a storage area in the physical disk group 104 allocated to the clone volume (Step S704).

In Step S703 or S704 described above, the linked-clone-volume management unit 105 may read data stored in the physical disk group 104 via the disk control unit 103.

The linked-clone-volume management unit 105 notifies the read data to the host control unit 102, and the host control unit 102 returns the data to the virtual machine 101a.

The aforementioned process will be described with reference to a specific example illustrated in FIG. 8A.

Figure 8A:
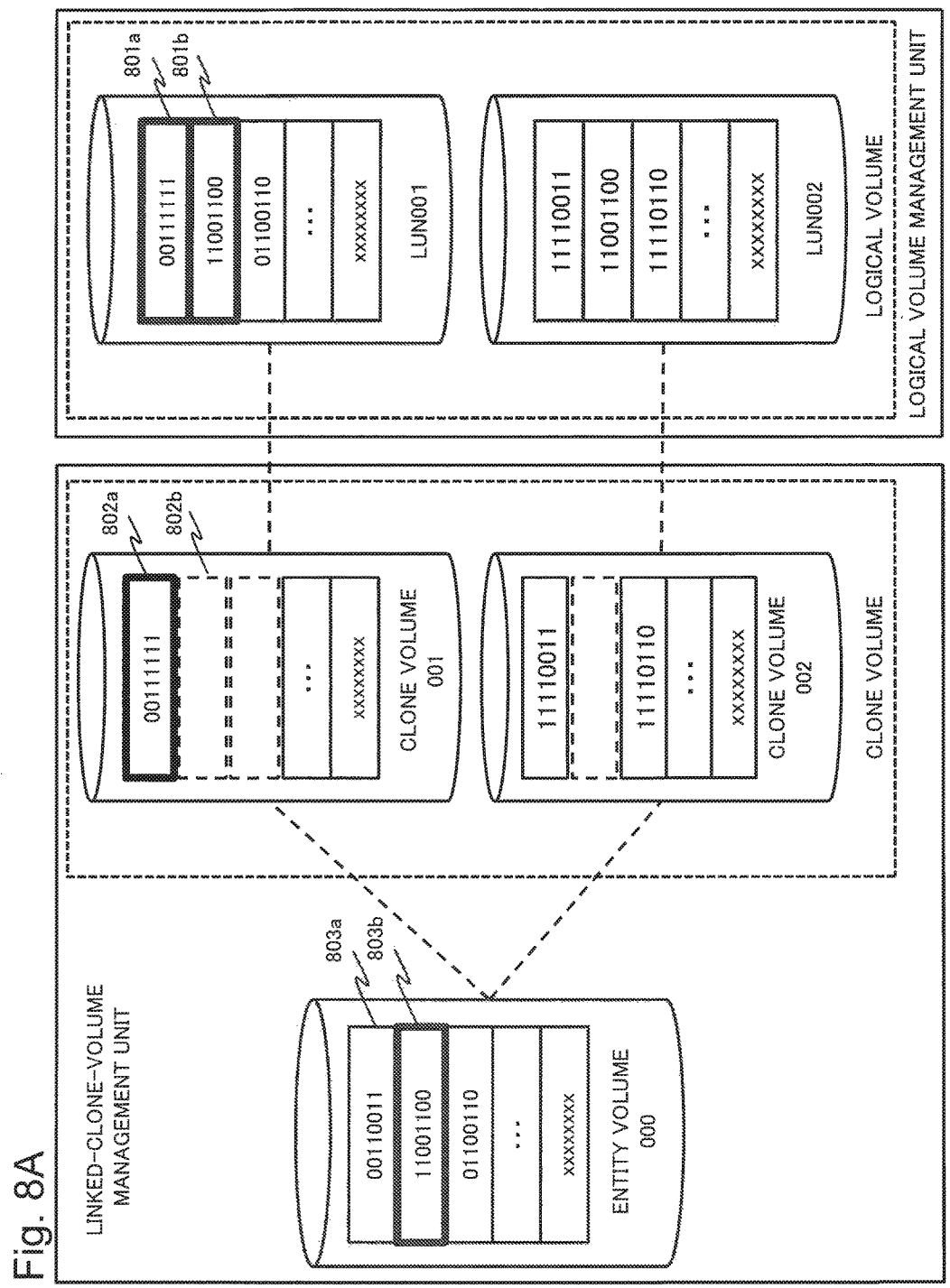
FIG. 8A is an explanatory diagram (1/2) schematically illustrating a relation between data included in respective storage areas according to the first exemplary embodiment of the present invention.

In the FIG. 8A, some difference areas (for example, 802a) in clone volumes (for example, clone volume "001" or "002") is updated (that is, storing different data) from data stored in relevant areas (for example, 803a) in an entity volume (entity volume "000"), and physical storage areas are assigned to these difference areas in clone volume. A physical storage area is not assigned to a difference area (for example, 802b), that is not updated, in the clone volume.

For example, it is assumed that the virtual machine 101a notifies the access request for data included in an area 801a in the logical volume. As exemplified in FIG. 8A, an area 802a in the clone volume "001" associated with the area 801a in the logical volume includes (stores) data different from an area 803a in the entity volume "000". In other words, in the clone-volume-difference management table 201b, information indicating "valid" (such as "1") is set to the difference validity flag for the area 802a. In this case, data included in the area 802a (clone volume "001") are notified as a response to the virtual machine 101a.

For another example, it is assumed that the virtual machine 101a notifies an access request for data included in an area 801b in the logical volume. As expamplified in FIG. 8A, there is no difference between the area 802b in the clone volume "001", associated with the area 801b in the logical volume, and an area 803b in the entity volume. In other words, in the clone-volume-difference management table 201b, information indicating "invalid" (such as "0") is set to the difference validity flag for the area 802b. In this case, data included in the area 803b (entity volume "000") are notified as a response to the virtual machine 101a.

Figure 9:
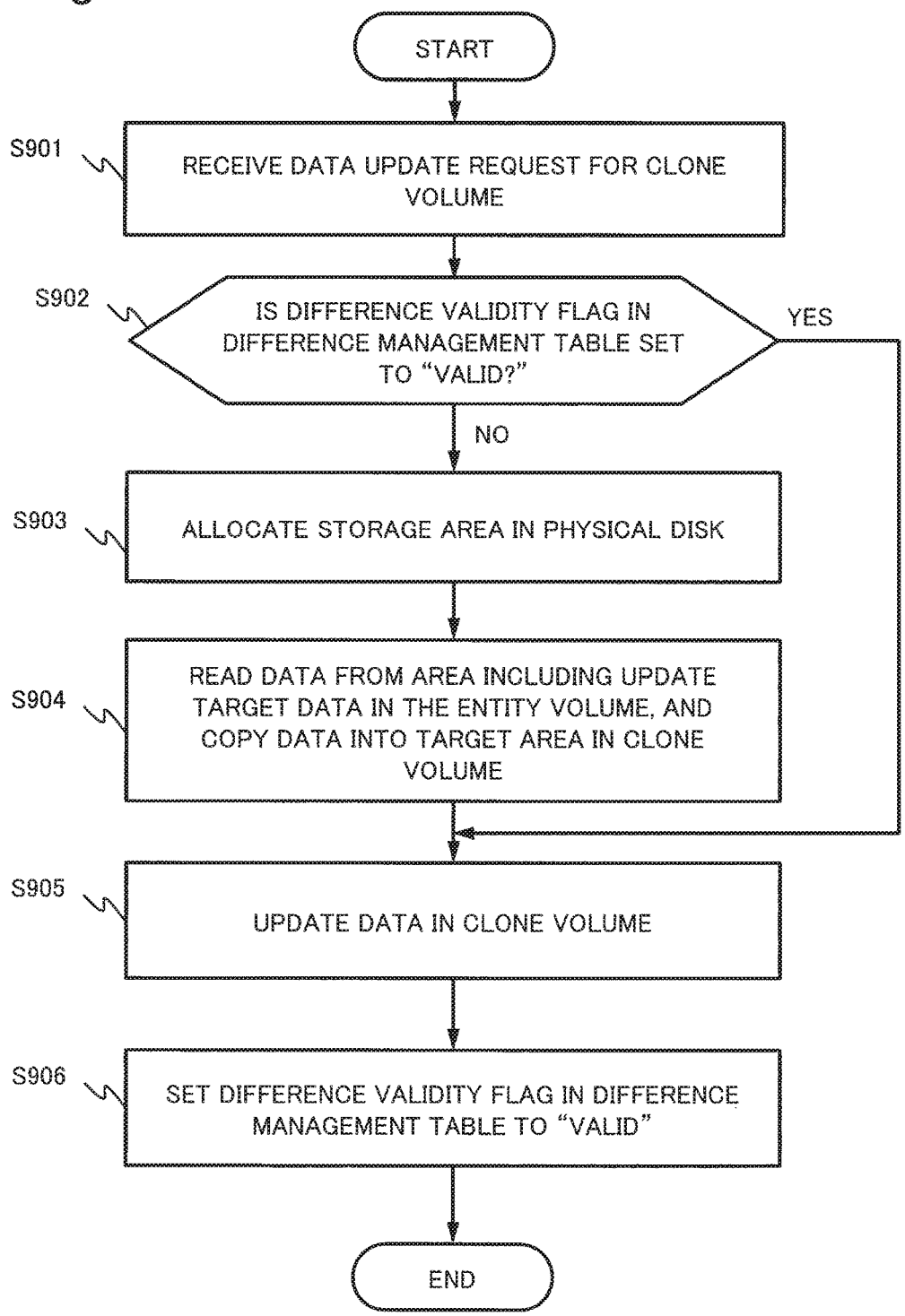
FIG. 9 is a flowchart exemplifying an operation (data update process) of the storage system according to the first exemplary embodiment of the present invention.

In the following, a process executed when a data write (update) request is notified from the virtual machine 101a to the storage system 100 will be described with reference to a flowchart exemplified in FIG. 9.

The data write (update) request is notified from the virtual machine 101a to the storage system 100 (Step S901). More specifically, for example, the virtual machine 101a notifies an update request for specific data (or an area) in a logical volume provided by the logical volume management unit 107 to the host control unit 102. Such the update request may be represented, for example, by a specific command. For example, the host control unit 102 analyzes the update request and requests update access to the data to the linked-clone-volume management unit 105. The host control unit 102 requests, for example, update access to an address area storing the data.

The linked-clone-volume management unit 105 refers the difference management table 201 in the linked-clone-function control unit 106 and confirms the difference validity flag (503 in FIG. 5) for the difference area storing the data. Then, the linked-clone-volume management unit 105 determines whether or not information indicating "valid" is set to the difference validity flag (Step S902).

When the difference validity flag is set to "valid" (YES in Step S902), the difference area in a clone volume including (storing) a target data for updating (hereinafter referred as update target data) is updated by use of the data notified by the virtual machine 101a (Step S905). Thus, data in a storage area, in the physical disk group 104, that is assigned to the difference area in the clone volume including the update target data are updated.

On the other hand, when the difference validity flag is set to "invalid" (NO in Step S902), the linked-clone-volume management unit 105 allocates a physical storage area in the physical disk group 104 (Step S903). In this case, the linked-clone-volume management unit 105 may alternatively request the disk control unit 103 to allocate a physical storage area in the physical disk group 104. The size (storage capacity) of the physical storage area to be allocated may be determined depending on the size of the update target data or the size of the difference area. The physical storage area allocated by the linked-clone-volume management unit 105 is assigned to the difference area in the clone volume including the update target data.

The linked-clone-volume management unit 105 reads the update target data from the difference area in the entity volume including (storing) the update target data and copies the data to the relevant area in the clone volume (Step S904). The copied data are stored in the physical storage area allocated in Step S903 described above.

The linked-clone-volume management unit 105 updates the difference area in the clone volume copied from the entity volume (in Steps S903 and S904) with the data notified from the virtual machine 101a (Step S905). Thus, data stored in a storage area in the physical disk group 104 allocated to the difference area in the clone volume including the update target data are updated. In Step S905, the linked-clone-volume management unit 105 may request the disk control unit 103 to update data in the specific physical storage area in the physical disk group 104.

After such the update process, the linked-clone-function control unit 106 sets information indicating "valid" to the difference validity flag for the difference area including the aforementioned updated data in the clone-volume-difference management table 201b (Step S906). More specifically, the linked-clone-function control unit 106 may set, for example "1" to the difference validity flag. In this case, the linked-clone-volume management unit 105 may directly set the difference validity flag in the clone-volume-difference management table 201b. Alternatively, the linked-clone-volume management unit 105 may notify completion of the aforementioned update process to the linked-clone-function control unit 106, and the linked-clone-function control unit 106 may subsequently set the difference validity flag.

Figure 10:
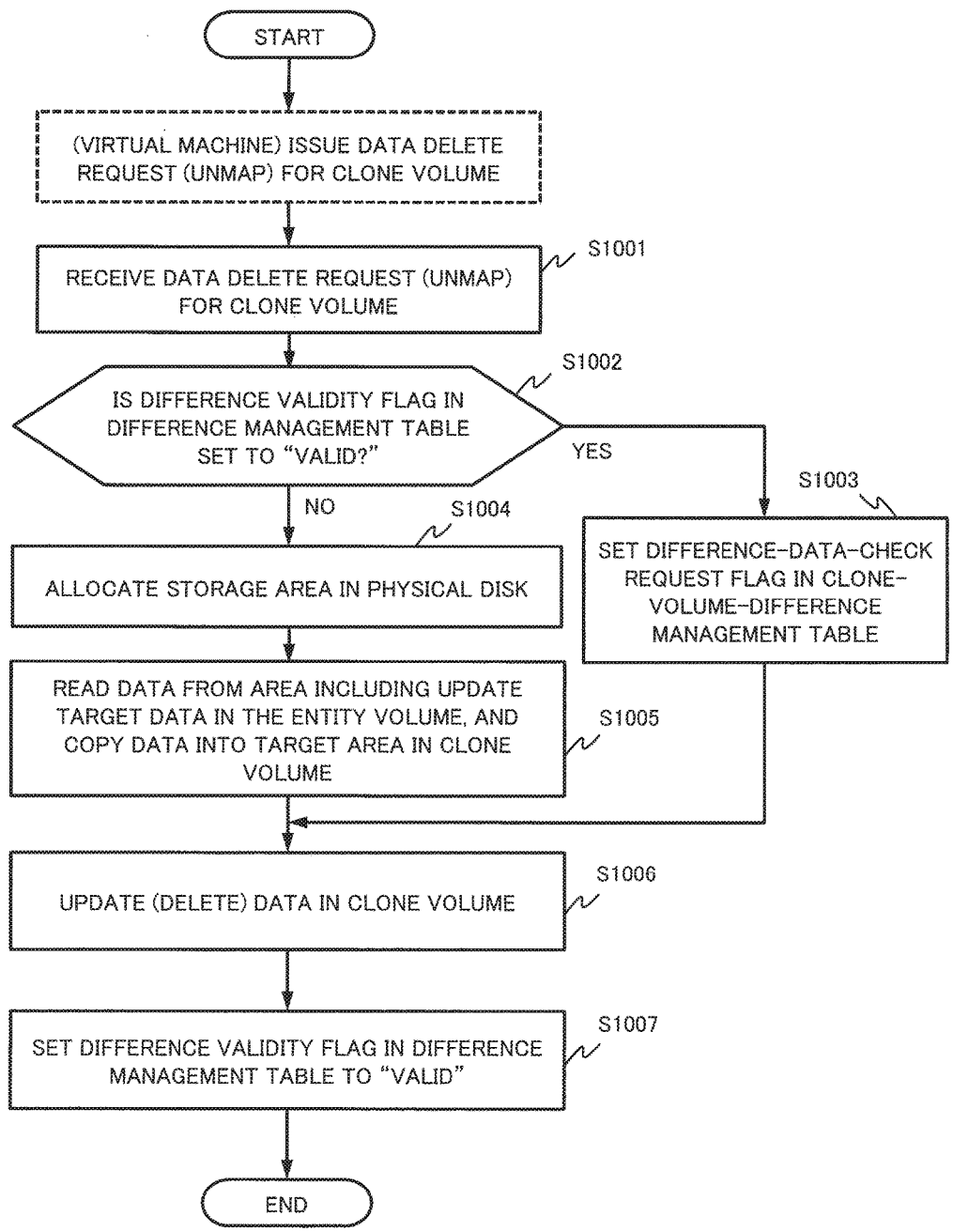
FIG. 10 is a flowchart exemplifying an operation (data deletion process) of the storage system according to the first exemplary embodiment of the present invention.

In the following, a process performed when the virtual machine 101a notifies a delete request for data included (held) in a clone volume will be described with reference to a flowchart exemplified in FIG. 10.

The storage system 100 according to the present exemplary embodiment is able to handle the UNMAP command defined in the SCSI command set. The storage system 100 notifies the virtual machine 101a of its ability of handling the UNMAP command. Alternatively, the virtual machine 101a may recognize that the storage system 100 can handle the UNMAP command by, for example, referencing setting information related to the storage system 100 and the like. The UNMAP command is a command for releasing an unused area in a physical disk. More specifically, for example, the virtual machine 101a issues an UNMAP command when deleting specific data. When a physical storage area to which the UNMAP command is issued becomes unused, a storage system that can handle the UNMAP command is able to release the physical storage area.

When deleting data in a clone volume, the virtual machine 101a notifies the delete request to the storage system 100. At this time, the virtual machine 101a issues the UNMAP command to the storage system 100.

The host control unit 102 receives a data delete request notified from the virtual machine 101a (Step S1001). More specifically, the host control unit 102 accepts the UNMAP command for a logical volume assigned with an LUN. The host control unit 102 notifies the delete request to the linked-clone-function control unit 106.

The linked-clone-function control unit 106 refers the clone-volume-difference management table 201b and confirms the difference validity flag (503 in FIG. 5) for a difference area including data for which the delete request is issued (Step S1002).

When the difference validity flag is set to "valid" (YES in Step S1002), the linked-clone-function control unit 106 sets "valid" to the difference-data-check request flag for the difference area in the clone-volume-difference management table 201b (Step S1003). In this case, the linked-clone-function control unit 106 may notify the linked-clone-volume management unit 105 of deletion of the data.

When the difference validity flag is set to "invalid" (NO in Step S1002), the difference area, in a clone volume, that includes data for which the delete request is issued, is not updated. Thus, the linked-clone-function control unit 106 notifies the linked-clone-volume management unit 105 to execute a similar process to the aforementioned data update process. In this case, the linked-clone-volume management unit 105 allocates a physical storage area from the physical disk group 104 (Step S1004). The physical storage area allocated by the linked-clone-volume management unit 105 is assigned to the difference area in the clone volume including target data for deleting (hereinafter referred as deletion target data). Then, the linked-clone-volume management unit 105 reads data from a difference area in an entity volume including the deletion target data and copies the data to a relevant area in the clone volume (Step S1005). The copied data are stored in the physical storage area allocated in Step S1004 described above.

When Step S1003 or S1005 is completed, the linked-clone-volume management unit 105 deletes the deletion target data from the clone volume (Step S1006). The linked-clone-volume management unit 105 may request the disk control unit 103 to delete the deletion target data from the physical storage area allocated to the clone volume. The disk control unit 103 deletes the data included in the physical storage area, in accordance with the request described above. More specifically, the disk control unit 103 deletes the deletion target data from the physical storage area, and sets data "0" to the physical storage area. The linked-clone-volume management unit 105 may notify completion of the deletion process described above, to the linked-clone-function control unit 106.

The linked-clone-function control unit 106 sets the difference validity flag for the difference area in the clone volume including the deletion target data to "valid" (Step S1007). After completion of the aforementioned processes in Steps S1002 to S1007, the linked-clone-function control unit 106 may notify process completion to the host control unit 102. When receiving such notification, the host control unit 102 may return delete completion to the virtual machine 101a that issued the delete request (UNMAP command).

Figure 11:
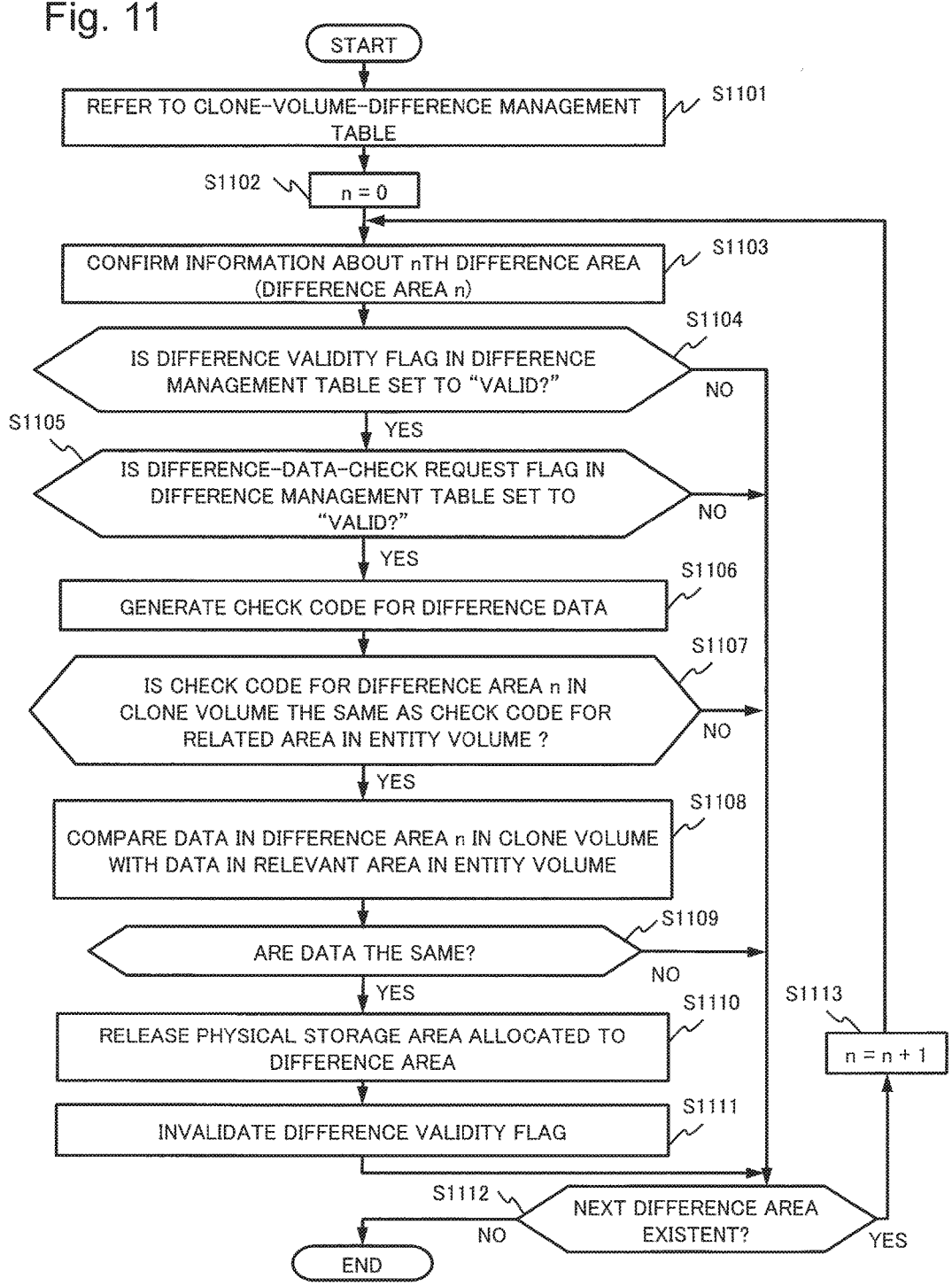
FIG. 11 is a flowchart exemplifying an operation (release of a physical storage area) of the storage system according to the first exemplary embodiment of the present invention.

In the following, a process of releasing a physical storage area allocated in the physical disk group 104 will be described with reference to a flowchart exemplified in FIG. 11.

The difference information management unit 108 monitors the clone-volume-difference management table 201b for each clone volume, for example, at a specific point in time. Such the specific point in time may be, for example, a point in time later than a point in time of accepting a delete request for the aforementioned specific data. The difference information management unit 108 may, for example, observe the clone-volume-difference management table 201b at a predetermined time interval.

The difference information management unit 108 executes a following process, in accordance with a difference management table for every clone volume included in the clone-volume-difference management table 201b.

First, the difference information management unit 108 refers to the clone-volume-difference management table 201b (Step S1101). In this case, the difference information management unit 108 may refer the clone-volume-difference management table 201b through the linked-clone-function control unit 106.

The difference information management unit 108 confirms information about an "n"th difference area (where "n" is an integer equal to or greater than zero) in the clone-volume-difference management table 201b (S1103). Note that "n" is initialized to zero ("0") (Step S1102). A "zero (0)"-th difference area may be a difference area arranged at the head of the clone-volume-difference management table 201*b*. The "n"th difference area may be hereinafter simply referred to as a difference area "n".

The difference information management unit 108 confirms whether the difference validity flag (503 in FIG. 5) for a difference area "n" is set to "valid" (Step S1104).

When the difference validity flag is not "valid" (NO in Step S1104), the difference information management unit 108 confirms whether a next difference area exists in the clone-volume-difference management table 201*b* (Step S1112). When a next difference area exists (YES in Step S1112), the difference information management unit 108 increments "n" (Step S1113) and continues the process from Step S1103. When a next difference area does not exist (NO in Step S1112), the difference information management unit 108 finishes the process.

When the difference validity flag is "valid" (YES in Step S1104), the difference information management unit 108 confirms whether the difference-data-check request flag (504 in FIG. 5) for the difference area "n" is set to "valid" (Step S1105).

When the difference-data-check request flag is not "valid" (NO in Step S1105), the difference information management unit 108 proceeds the process from Step S1112.

When the difference-data-check request flag is "valid" (YES in Step S1105), the difference information management unit 108 generates a check code for data included (stored) in the difference area "n" (Step S1106). In this case, the difference information management unit 108 may generate the check code by use of the check code generation unit 602.

The difference information management unit 108 compares whether or not the check code for the difference area "n" in a clone volume is identical to a check code for a relevant area, in an entity volume, associated with the difference area "n" (Step S1107). The difference information management unit 108 may refer a difference data check code for the aforementioned difference area by referring the entity-volume-difference management table 201*a*.

When these check codes are not identical (NO in Step S1107), the difference information management unit 108 proceeds with the process from Step S1112.

When the check codes are identical (YES in Step S1107), the difference information management unit 108 executes a following process. That is, the difference information management unit 108 compares data included in the difference area "n" in the clone volume, with data included in the relevant area in the entity volume associated with the difference area "n" (Step S1108). Specifically, the difference information management unit 108 executes a compare process on the whole of data included in the difference area "n" in the clone volume, and the whole of data included in the relevant area in the entity volume associated with the difference area "n". In the case described above, all the data included in the difference area "n" represent data after deletion target data (target data of a delete request accepted in Step S1001) are deleted in the difference area "n".

When these data are determined to be not the same (are not identical) as a result of the comparison (NO in Step S1109), the difference information management unit 108 proceeds with the process from Step S1112.

When these data are determined to be identical as a result of the comparison (YES in Step S1109), the difference information management unit 108 releases a physical storage area (storage capacity) allocated to the difference area "n" in the physical disk group 104 (Step S1110). In this case, the difference information management unit 108 may notify the disk control unit 103 of release of the physical storage area allocated to the difference area "n", and the disk control unit 103 may subsequently execute the release process for the physical storage area.

The difference information management unit 108 invalidates the difference validity flag for the difference area "n" in the clone-volume-difference management table 201*b* (Step S1111). The difference information management unit 108 may set information indicating "invalid" (such as "0") to the difference validity flag.

By the process described above, the difference validity flag for the difference area "n" is set to "invalid". Thus, when access occurs to the difference area "n", the relevant area in the entity volume associated with the difference area "n" is accessed, from the next time of the access. Further, when the clone volume is newly updated, the released physical storage area in the physical disk group 104 may be used as a storage area for storing data associated with an updated difference area.

After the Step S1111, the difference information management unit 108 proceeds with the process from Step S1112.

Figure 8B:
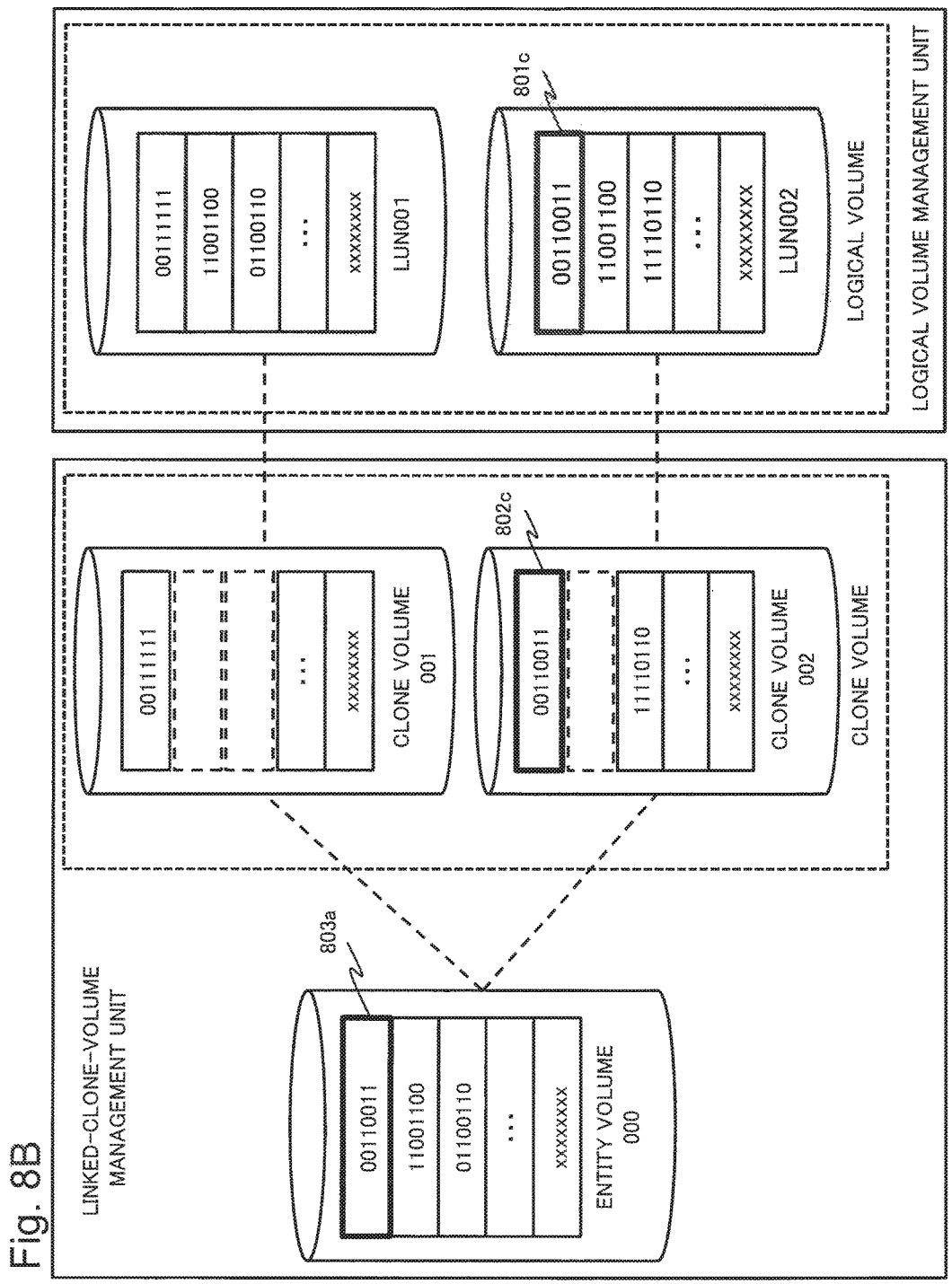
FIG. 8B is an explanatory diagram (2/2) schematically illustrating a relation between data included in respective storage areas according to the first exemplary embodiment of the present invention.

The aforementioned process will be explained with reference to a specific example illustrated in FIG. 8B. In the specific example illustrated in FIG. 8B, it is assumed, for example, that the virtual machine 101*a* notifies a delete request for data included in an area 801*c* in the logical volume, in the situation illustrated in FIG. 8A. As illustrated in FIG. 8B, the storage area 802*c* in a clone volume "002" and the area 803*a* in the entity volume "000" include identical data, as a result of deleting data included in the area 801*c*. In this case, the difference information management unit 108 releases a storage area in the physical disk group 104 allocated to the storage area 802*c* in the clone volume "002" (Steps S1101 to S1111). This enables the storage system 100 to release an unnecessary storage area redundantly storing identical data in the physical disk group 104.

As described above, the difference information management unit 108 may execute a process related to Steps S1101 to S1113 described above at certain point in time different from a point in time of accepting a data delete request. The process related to Steps S1101 to S1113 described above may take a relatively long processing time. The storage system 100 may quickly return a response at the point in time of receiving the delete request from the host apparatus 101, and subsequently perform the process described above, which takes a relatively long processing time at an appropriate point in time. Thus, the storage system 100 is able to release an unnecessary storage area in the physical disk group 104 without reducing response efficiency to the host apparatus 101.

(Advantageous Effects)

When data included in the difference area in the clone volume are deleted, the storage system 100 confirms sameness between the data included in the difference area in the clone volume, and data included in a relevant area in the entity volume. Then, when the data included in these areas are identical, the storage system 100 releases a physical storage area allocated to the difference area in the clone volume. Thus, the storage system 100 according to the present exemplary embodiment is able to efficiently manage and to operate a storage area secured in the physical disk group 104 in a virtual machine environment using the linked clone function. That is, the storage system 100 according to the present exemplary embodiment is able to realize efficient use of storage capacity (capacity of a used physical storage area) allocated in the physical disk group 104.

More specifically, triggered by issuance and notification of the UNMAP command from the virtual machine 101a, the storage system 100 checks whether or not data included in associated difference areas in the entity volume and the clone volume are identical. Then, when the data included in these difference areas are confirmed to be identical, as a result of such a check, the storage system 100 releases a physical disk capacity allocated to the difference area in the clone volume, in the physical disk group 104. This enables the storage system 100 to release a storage area in the physical disk group 104 by avoiding redundantly storing identical data in the physical disk group 104.

As described above, the storage system 100 according to the present exemplary embodiment is capable of efficiently using a storage area by reducing redundantly stored data. Thus, the storage system 100 is able to provide environments for a larger number of virtual machines.

Second Exemplary Embodiment

Figure 12:
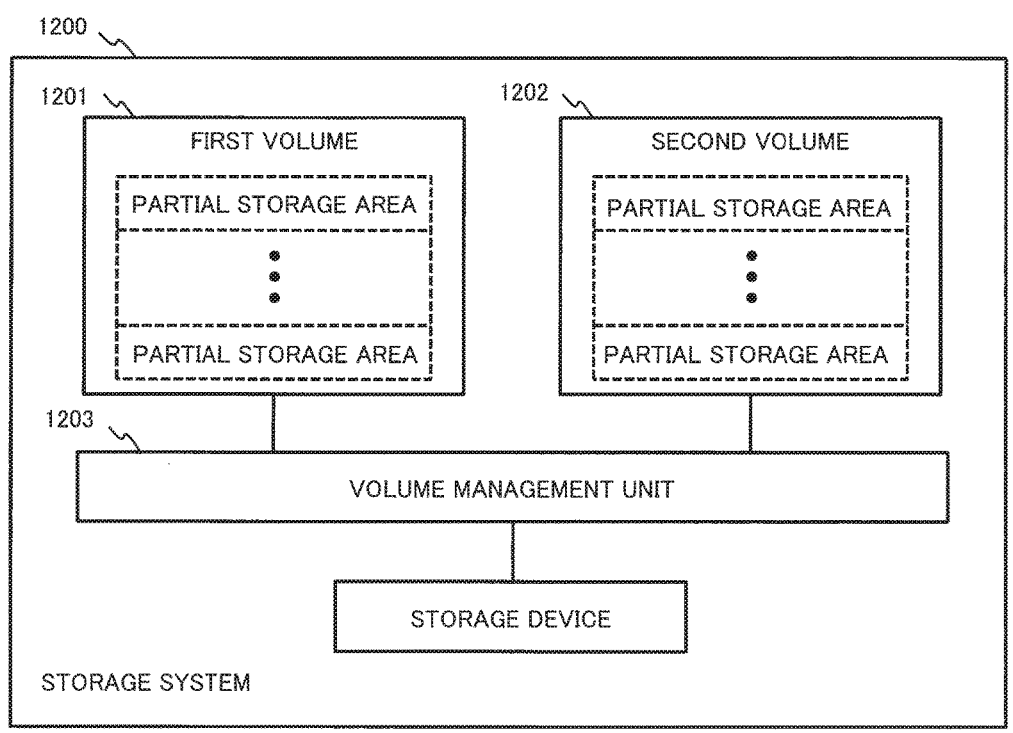
FIG. 12 is a block diagram exemplifying a functional configuration of a storage system 1200 according to the second exemplary embodiment of the present invention.

Next, the second exemplary embodiment of the present invention will be described. FIG. 12 is a block diagram exemplifying a functional configuration of a storage system 1200 according to the second exemplary embodiment of the present invention.

As exemplified in FIG. 12, the storage system 1200 according to the present exemplary embodiment includes a first volume 1201, a second volume 1202, and a volume management unit 1203. These components constituting the storage system 1200 are communicably interconnected by an appropriate communication method. Each component will be described below.

The first volume 1201 provides a storage area (such as a logical storage area). A storage area provided by the first volume 1201 may include a plurality of partial storage areas. The first volume 1201 may, for example, be configured to be similar to the entity volume according to the aforementioned first exemplary embodiment.

The second volume 1202 provides a storage area including a difference from the first volume 1201. A storage area provided by the second volume 1202 may include a plurality of partial storage areas. The second volume 1202 may, for example, be configured to be similar to the clone volume according to the aforementioned first exemplary embodiment. Further, a partial storage area in the second volume described above may be associated with a partial storage area in the first volume.

The volume management unit 1203 accepts a delete request, for the storage system 1200, that represents a request of deleting specific data (deletion target data). The volume management unit 1203 confirms sameness between data included in a second specific partial storage area in the second volume 1202 and data included in a first specific partial storage area in the first volume 1201. The second specific partial storage area represents a partial storage area included in a storage area provided by the second volume 1202, and includes the specific data (deletion target data). The first specific partial storage area represents a partial storage area included in a storage area provided by the first volume 1201, and is associated with the second specific partial area described above. The partial storage area included in the storage area provided by the second volume 1202 may be considered similar to, for example, the difference area in the clone volume according to the aforementioned first exemplary embodiment. In this case, the second specific partial storage area corresponds to a partial area including deletion target data in the clone volume. Further, the partial storage area included in the storage area provided by the first volume 1201 can be considered similar to, for example, a difference area in the entity volume according to the aforementioned first exemplary embodiment. In this case, the first specific partial storage area corresponds to the relevant area associated with the second specific partial storage area.

The volume management unit 1203 releases an area allocated to the second specific partial storage area, in a storage area included in a storage device, which stores data included in the second volume 1202, in accordance with the aforementioned result of identity confirmation. For example, the volume management unit 1203 may release an area in the storage device allocated to the aforementioned second specific partial storage area when data included in the second specific partial storage area and data included in the first specific partial storage area are identical.

Such the storage device may be a physical storage device or a logical storage device. Further, the storage device may be virtualized. The storage device may be configured to be similar to, for example the physical disk group 104 according to the aforementioned first exemplary embodiment.

The volume management unit 1203 may be capable of providing a function implemented on each component constituting the storage system 100 according to the aforementioned the first exemplary embodiment, for example. That is, the volume management unit 1203 may provide respective functions implemented on the disk control unit 103, the linked-clone-volume management unit 105, the linked-clone-function control unit 106, the difference information management unit 108, and the like according to the aforementioned first exemplary embodiment.

When request of deleting specific data is notified to a storage including the first volume and the second volume, the storage system 1200, configured as described above, specifies a partial storage area in the second volume including the specific data. The storage system 1200 specifies a partial storage area in the first volume (first specific partial storage area) associated with the specified partial storage area in the second volume (second specific partial storage area). The storage system 1200 determines whether or not data included in those partial storage areas are identical. Then, in accordance with the determination result, the storage system 1200 is able to determine whether or not to release the storage area in the storage device allocated to the second specific partial storage area. Thus, for example, when the first specific partial storage area and the second specific partial storage area include identical data, the storage system 1200 is able to operate the data so that the data are not redundantly stored in the storage device.

As described above, the storage system 1200 according to the present exemplary embodiment is capable of efficiently using a storage area by reducing redundantly stored data. Thus, the storage system 1200 is able to provide more virtual machine environments.

<Hardware and Software Program (Computer Program) Configurations>

A hardware configuration capable of implementing the respective exemplary embodiments described above will be described as follows.

The storage systems (100, 1200) described in the respective aforementioned exemplary embodiments are hereinafter collectively referred to simply as a "storage system." Further, each component of a storage system is referred to simply as a "storage system component."

The storage system described in the respective aforementioned exemplary embodiments may be configured with one or more dedicated hardware apparatuses. In that case, each component illustrated in each of the aforementioned drawings may be implemented as hardware integrating the components at least in part, or in whole (such as an integrated circuit implemented with processing logic, and a storage device).

For example, when a storage system is implemented with dedicated hardware, a component of such a storage system may include an integrated circuit capable of providing each function implemented as a system-on-a-chip (SoC) or the like. In this case, for example, data held in a storage system component may be stored in a random access memory (RAM) area and a flash memory area integrated as an SoC. Further, in this case, a known communication bus may be adopted as a communication line interconnecting each storage system component. Further, a communication line interconnecting each component is not limited to a bus connection, and each component may be interconnected by peer-to-peer communication. When a storage system is configured with a plurality of hardware apparatuses, respective hardware apparatuses may be communicably interconnected by an appropriate communication method (wired, wireless, or a combination of both).

Figure 13:
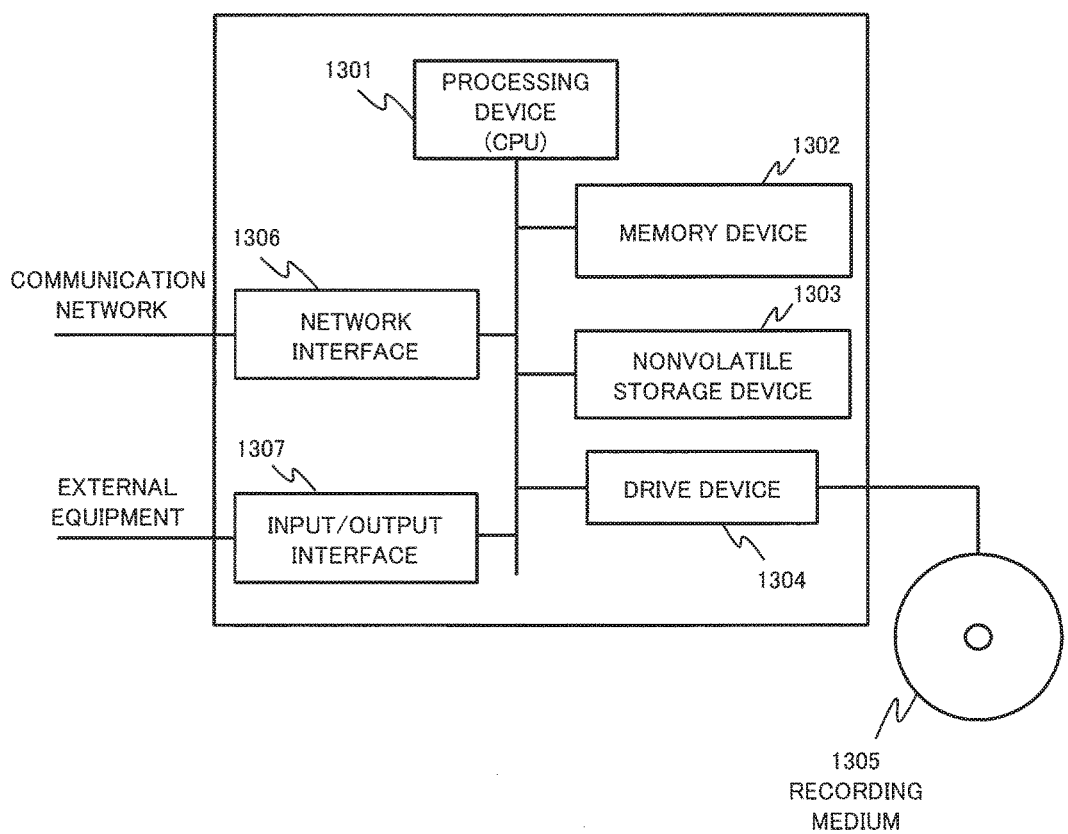
FIG. 13 is a diagram exemplifying a hardware configuration capable of providing a storage system or a component thereof according to each exemplary embodiment of the present invention.

Further, the storage system described above or a component thereof may be configured with general-purpose hardware as exemplified in FIG. 13 and various software programs (computer programs) executed by such hardware. In this case, the storage system may be configured with one or more general-purpose hardware apparatuses and software programs.

A processing device 1301 in FIG. 13 is an arithmetic processing device such as a general-purpose central processing unit (CPU) and a microprocessor. The processing device 1301 may, for example, read various software programs stored in a nonvolatile storage device 1303 described later into a memory device 1302, and perform processes, in accordance with such software programs. For example, the storage system component according to the respective aforementioned exemplary embodiments can be implemented as a software program executed by the processing device 1301.

The memory device 1302 is a memory such as a RAM, that can be referred from the processing device 1301, and stores a software program, various types of data, and the like. The memory device 1302 may be configured by a volatile memory apparatus.

A nonvolatile storage device 1303 is a nonvolatile storage such as a magnetic disk drive and a flash memory based semiconductor storage apparatus. The nonvolatile storage device 1303 can store various software programs, data, and the like. For example, each physical disk included in the physical disk group 104 according to the respective aforementioned exemplary embodiments can be implemented by use of the nonvolatile storage device 1303.

A network interface 1306 is an interface device connected to a communication network and may adopt, for example, an interface device for wired and wireless local area network (LAN) connection. The storage system according to the respective aforementioned exemplary embodiments may be communicably connected to a host apparatus (such as the host apparatus 101) through the network interface 1306.

A drive device 1304 is, for example, a device processing data read/write from/to a recording medium 1305 described later.

The recording medium 1305 is, for example, a data-recordable recording medium such as an optical disk, a magneto-optical disk, and a semiconductor flash memory.

An input/output interface 1307 is a device controlling input/output from/to an external apparatus.

The storage system according to the respective aforementioned exemplary embodiments may or may not include the network interface 1306, drive device 1304, and the input/output interface 1307.

For example, the storage system of the present invention described with the respective aforementioned exemplary embodiments may be implemented by providing a software program capable of providing a function described in the respective aforementioned exemplary embodiments for the hardware apparatus exemplified in FIG. 13. More specifically, for example, the present invention may be implemented by the processing device 1301 executing a software program provided for the apparatus. In this case, an operating system, middleware such as database management software and network software, and the like operating on the hardware apparatus may perform part of each process.

Further, the aforementioned software program may be recorded in the recording medium 1305. In this case, the aforementioned software program may be configured to be appropriately stored in the nonvolatile storage device 1303 through the drive device 1304, in a shipping stage, an operating stage, or the like of the aforementioned storage system.

In the case described above, a supply method of various software programs to the aforementioned storage system may adopt a method of installing the software program by use of suitable tools, in a manufacturing stage before shipment, a maintenance stage after shipment, or the like. Further, the supply method of various software programs may adopt a currently common procedure such as downloading from outside systems via a communication line such as the Internet.

In such a case, the present invention can be considered as being configured with a code configuring the software program, or a computer-readable recording medium recording the code. In this case, such a recording medium is not limited to a medium independent of a hardware apparatus, and includes a recording medium storing or temporarily storing a software program transmitted and downloaded through a LAN, the Internet, and the like.

Further, the aforementioned storage system may be configured with a virtualized environment virtualizing the hardware apparatus exemplified in FIG. 13 and various software programs (computer programs) executed in the virtualized environment. In this case, a component of the hardware apparatus illustrated in FIG. 13 is provided as a virtual device in the virtualized environment. Also in this case, the present invention can be implemented with a configuration similar to a case in which the hardware apparatus exemplified in FIG. 13 is configured as a physical apparatus.

The present invention has been described above as examples applied to the aforementioned exemplary embodiments. However, the technical scope of the present invention is not limited to the respective aforementioned exemplary embodiments. It is obvious to those skilled in the art that various changes or modifications can be made to such exemplary embodiments. In such a case, a new exemplary embodiment with such a change or modification can be included in the technical scope of the present invention. Furthermore, an exemplary embodiment combining the respective aforementioned exemplary embodiments or new exemplary embodiments with such changes or modifications can be included in the technical scope of the present invention. This is obvious from matters described in CLAIMS. It is noted that the inventor's intent is to retain all equivalents of the claimed invention even if the claims are amended during prosecution.

Also, at least a part, or whole of the above described exemplary embodiments may be described as following Supplemental Notes. However, the present invention is not limited to the following Supplemental Notes.

(Supplemental Note 1)

A storage system including:

a first volume configured to provide a storage area;

a second volume configured to provide another storage area including a difference from the first volume; and a volume management unit configured to release an area allocated to a second specific partial storage area in a storage area in a storage device allocated to the second volume when accepting a delete request for specific data, based at least in part on a result of confirmation of sameness between data included in the second specific partial storage and data included in a first specific partial storage area, the second specific partial storage area being a partial storage area in the second volume including the specific data, the first specific partial storage area being a partial storage area in the first volume and being associated with the second specific partial storage area.

(Supplemental Note 2)

The storage system according to Supplemental Note 1, wherein the volume management unit releases the area allocated to the second specific partial storage area in the storage area in the storage device, when data included in the second specific partial storage area that includes the specific data, and data included in the first specific partial storage area that is associated with the second specific partial storage area, are identical.

(Supplemental Note 3)

The storage system according to Supplemental Note 1 or Supplemental Note 2, wherein the volume management unit:

determines whether or not the data included in the second specific partial storage area are updated from the data included in the first specific partial storage area associated with the second specific partial storage area, when accepting the delete request;

confirms sameness between the data included in the second specific partial storage area and the data included in the first specific partial storage area associated with the second specific partial storage area, when the data included in the second specific partial storage area are determined as updated data, as a result of the confirmation; and, releases the area allocated to the second specific partial storage area in the storage device, when the data included in the partial storage areas are determined to be identical.

(Supplemental Note 4)

The storage system according to Supplemental Note 3, wherein, when accepting the delete request, the volume management unit:

determines whether or not data included in the second specific partial storage area are updated, by referring second volume management information including difference validity information, that indicates, for each of one or more partial storage areas included in the second volume, whether or not data included in the partial storage area are updated from data included in the partial storage area that is included in the first volume and is associated with the partial storage area included in the second volume;

confirms sameness between the data included in the second specific partial storage area and the data included in the first specific partial storage area associated with the second specific partial storage area, when the second specific partial storage area is determined to be updated; and, releases the area allocated to the second specific partial storage area in the storage device, and sets information, indicating that data are not updated, to the difference validity information related to the second specific partial storage area, when data included in the partial storage areas are determined to be identical.

(Supplemental Note 5)

The storage system according to Supplemental Note 4, wherein the second volume management information includes difference check request information indicating, for each of one or more partial storage areas included in the second volume, whether or not the sameness needs to be determined between data included in the partial storage area included in the second volume and data that is included in the partial storage area in the first volume and is associated with the storage area included in the second volume, and the volume management unit:

sets information, indicating that determination of sameness is necessary, to the difference check request information related to the second specific partial storage area, when data included in the second specific partial storage area are determined to be updated, in accordance with the difference validity information related to the second specific partial storage area, at a point in time of accepting the delete request; and confirms sameness between data included in the second specific partial storage area and data included in the first specific partial storage area associated with the second specific partial storage area, at a point in time later than the point in time of accepting the delete request, when information, indicating that determination of sameness is necessary, is set to the difference check request information.

(Supplemental Note 6)

The storage system according to any one of Supplemental Note 3 to Supplemental Note 5, wherein the volume management unit determines, when determined that data included in the second specific partial storage area are updated, sameness between data that are included in the second specific partial storage area and data that are included in the first specific partial storage area, by comparing a check code generated from the data included in the second specific partial storage area with a check code generated from the data included in the first specific partial storage area associated with the second specific partial storage area, the check code being information that enables determining of whether or not the data and other data are identical.

(Supplemental Note 7)

The storage system according to Supplemental Note 6, wherein the volume management unit determines sameness between data included in the second specific partial storage area and data included in the first specific partial storage area, when determined that the check code generated from the data included in the second specific partial storage area and the check code generated from the data included in the first specific partial storage area associated with the second specific partial storage area are identical, by further comparing the whole of the data included in the second specific partial storage area with the whole of the data included in the first specific partial storage area.

(Supplemental Note 8)

The storage system according to any one of Supplemental Note 1 to Supplemental Note 7, wherein the volume management unit:

confirms sameness between data included in the second specific partial storage area and data included in the first specific partial storage area associated with the second specific partial storage area; and, sets a specific value to an area allocated to the second specific partial storage area in the storage device, when determined that the data are identical.

(Supplemental Note 9)

A storage management method including:

accepting a delete request for specific data included in a storage including a first volume providing a storage area and a second volume providing a storage area including a difference from the first volume; and releasing an area allocated to a second specific partial storage area in a storage area in a storage device allocated to the second volume, based at least in part on a result of confirmation of sameness between data included in the second specific partial storage area and data included in a first specific partial storage area, the second specific partial storage area being a partial storage area in the second volume including the specific data, the first specific partial storage area being a partial storage area in the first volume and being associated with the second specific partial area.

(Supplemental Note 10)

A non-transitory computer-readable storage medium recorded with a computer program, the computer program causing a computer to execute:

processing of accepting a delete request for specific data included in a storage including a first volume providing a storage area and a second volume providing a storage area including a difference from the first volume; and processing of releasing an area allocated to a second specific partial storage area in a storage area in a storage device allocated to the second volume, based at least in part on a result of confirmation of sameness between data included in the second specific partial storage area and data included in a first specific partial storage area, the second specific partial storage area being a partial storage area in the second volume including the specific data, the first specific partial storage area being a partial storage area in the first volume and being associated with the second specific partial storage area.

(Supplemental Note 11)

The storage system according to Supplemental Note 1, wherein the volume management unit:

newly allocates area on the storage device that is assigned to the partial storage area in the second volume, the partial storage area being associated to the the partial storage area including the specific data in the first volume, when the specific data is included in the storage area provided by the first volume;

copy the data included in the partial storage area in the first volume, to the partial storage area in the second volume;

delete the specific data in the partial storage area in the second volume;

determine whether or not to release the area in the storage device allocated for the partial storage area in the second volume, in accordance with a result of determination of the difference between data after the specific data have deleted in the partial storage area in the second volume, and data included in the partial storage area in the first volume.

(Supplemental Note 12)

The storage system according to Supplemental Note 3, wherein the volume management unit:

refers to a first volume management information including a check code that is calculated, for each partial storage area in the first volume, based at least part on data included in the partial storage area, and enables to determine whether the data and another data are identical or not;

determines, when receives the delete request and determines that data related to the second specific partial storage area are updated, the sameness between the data included in the second specific partial storage are and the data included in the first specific partial storage area, by comparing, the check code about the first specific partial storage area with the check code calculated from data included in the second specific partial storage area, the first specific partial storage area being included in the first volume and associated to the second specific partial storage area.

(Supplemental Note 13)

The storage system according to Supplemental Note 4, further comprising:

host control unit that is configured to provide a logical volume including a storage area that is associated to the first volume and the second volume to a host apparatus, and to process an access request, notified from the host apparatus, to the logical volume, and wherein the storage device is physical memory unit configured by physical storage apparatus, and wherein the volume management unit:

confirms the difference validity information about the partial storage area included in the second volume that is associated with the logical volume, when the access request is notified from the host apparatus, provides, to the host apparatus, data included in the partial storage area in the first volume, when the data included in the partial storage area in the second volume is not updated from the data included in the partial storage area in the first volume and is associated with the partial storage area in the second volume, and provides, to the host apparatus, data included in the partial storage area in the second volume, when the data included in the partial storage area in the second volume is updated from the data included in the partial storage area in the first volume and is associated with the partial storage area in the second volume.

There is a following situation related to the present invention described by use of the respective exemplary embodiments described above. That is, various virtualization technologies have widely used in recent years as technologies facilitating operation or management of an information communication system and being capable of reducing costs required therefor. Such virtualization technologies are capable of providing a virtual machine virtualizing an information processing apparatus and the like (or peripheral equipment thereof and the like), and are capable of configuring an information system using such a virtual machine.

As described above, technologies of virtualizing a storage system (or a storage apparatus) includes a technology called a linked clone function.

A technology, that enables efficient management of difference data and efficient use of storage capacity, is required for a storage system implemented with the linked clone function, When a virtual machine updates data in a storage system provided with the linked clone function, a following process is performed. That is, the storage system allocates a storage area (a storage area for storing difference data) to be used by a clone volume from a physical disk. The storage system updates data (difference data) stored in the allocated storage area. Then, the storage system manages information indicating that difference exist between an entity volume and a clone volume by use of, for example, management information data (such as a management table).

For example, there is a case that a specific storage area in the clone volume and a corresponding specific storage area in the entity volume respectively include identical data, such as a case that updated data are deleted. In this case, although data included in the clone volume and data included in the entity volume are identical, there is a possibility that a storage area may be redundantly allocated from a physical disk.

When operation of the storage system is continued and creation and deletion of files in a virtual machine are repeated, there is a possibility that many areas including identical data are created in the entity volume and the clone volume. When difference data are generated in the clone volume as described above, there is a case that physical disk capacity storing the difference data is remain allocated until the clone volume itself is deleted. In other words, in this case, identical data are stored in a plurality of areas redundantly, and therefore there is a possibility that efficient use of a storage is not sufficiently achieved. That is, in this case, despite of adopting the linked clone technology, a problem may occur that efficient operation of the system is not sufficiently performed, the efficient operation being provided by allocating a storage area in a physical disk only for storing different data between the clone volume and the entity volume.

The technology disclosed in aforementioned PTL 1 merely discloses a method for converting an existing virtual machine into a virtual machine using the linked clone function. The technology disclosed in PTL 2 is a technology of eliminating redundant data when creating replicated data in a backup process and the like. PTL 3 merely discloses a technology of excluding an unused area not referenced in a file system in a host apparatus from a managed object in a storage system. PTL 4 merely discloses a specific method for releasing data stored in a storage. Further, PTL 5 merely discloses a technology capable of verifying data identity in a plurality of storages. In other words, none of the technologies disclosed in the respective patent literatures described above is a technology capable of solving the problem described above.

The present invention has been made in view of the situation described above.

That is, the present invention is able to provide efficient use of a storage area by reducing redundantly stored data.

The invention claimed is:

1. A storage system comprising:
a first volume configured to provide a storage area for storing master data;
a second volume configured to provide another storage area for storing difference data including a difference from the master data in the first volume; and
a processor configured to execute a volume management unit configured to:
determine, when receiving a delete request for specific data stored in a second specific partial storage area in the second volume, whether data in the second specific partial storage area after deleting the specific data and data stored in a first specific partial storage area in the first volume, associated with the second specific partial storage area are identical, the first specific partial storage area being a partial storage area in the first volume and the second specific partial storage are being a partial storage area in the second volume, and
release, when the data in the second specific partial storage area after deleting the specific data and the data stored in the first specific partial storage area are determined to be identical, a physical storage area assigned to the second specific partial storage area, the physical storage area being included in a storage device allocated to the second volume,
wherein the volume management unit is further configured to: determine whether the data included in the second specific partial storage area after deleting the specific data and the data included in the first specific partial storage area are identical by:
generating a first check code for a difference area in the first specific partial storage area corresponding to the specific data to be deleted in the second specific partial storage area;
generating a second check code for a difference area in the second specific partial storage area corresponding to the specific data to be deleted;
comparing the first check code with the second check code;
in response to determining that the first check data is identical to the second check code, comparing the entire data included in the difference area in the second specific partial storage area with the entire data included in the difference area in the first specific partial storage area corresponding to the specific data.

2. The storage system according to claim 1, wherein the volume management unit is further configured to:
determine, when receiving the delete request, whether the data included in the second specific partial storage area is updated from the data included in the first specific partial storage area associated with the second specific partial storage area and which a part of the master data;
determine, when the data included in the second specific partial storage area are determine to be updated, whether the data in the second specific partial storage area after deleting the specific data and the data in the first specific partial storage area associated with the second specific partial storage area are identical; and
release, when the data in the second specific partial storage area after deleting the specific data and the data in the first specific partial storage area associated with the second specific partial storage area are determined to be identical, the physical storage area assigned to the second specific partial storage area in the storage device.

3. The storage system according to claim 2, wherein, the volume management unit is further configured to:
determine, when receiving the delete request, whether data included in the second specific partial storage area are updated, by referring to second volume management information including difference validity information, that indicates, for each of one or more partial storage areas included in the second volume, whether data included in the partial storage area in the second volume are updated from data included in the partial storage area that is included in the first volume, the partial storage area included in the first volume being associated with the partial storage area included in the second volume;

determine, when the second specific partial storage area is determined to be updated, whether the data included in the second specific partial storage area after deleting the specific data and the data included in the first specific partial storage area associated with the second specific partial storage area are identical; and release, when the data in the second specific partial storage area after deleting the specific data and the data in the first specific partial storage area associated with the second specific partial storage area are determined to be identical, the physical storage area assigned to the second specific partial storage area in the storage device, and set information, indicating that data are not updated, to the difference validity information regarding to the second specific partial storage area.

4. The storage system according to claim 3, wherein the second volume management information includes difference check request information indicating, for each of one or more partial storage areas included in the second volume, necessity of determining whether or not the data included in the partial storage area included in the second volume after deleting the specific data and the data included in the partial storage area in the first volume are identical, the partial storage area in the first volume being associated with the storage area included in the second volume, and the volume management unit is further configured to: set, at a point in time of receiving the delete request and in a case the data included in the second specific partial storage area are determined to be updated in accordance with the difference validity information regarding to the second specific partial storage area, information indicating that determining identicalness is necessary to the difference check request information regarding to the second specific partial storage area; and determine, after the point in time of receiving the delete request and in a case that information indicating that determining identicalness is necessary is set to the difference check request information, whether data included in the second specific partial storage area after deleting the specific data and data included in the first specific partial storage area associated with the second specific partial storage area are identical.

5. The storage system according to claim 2, wherein at least one of the first check code and the second check code is a hash value calculated from the data included in at least one of the first specific partial storage area and the second specific partial storage area.

6. The storage system according to claim 1, wherein the volume management unit is further configured to:

determine whether the data included in the second specific partial storage area after deleting the specific data and the data included in the first specific partial storage area are identical, by further comparing the entire data included in the second specific partial storage area with the entire data included in the first specific partial storage area, on a per byte basis.

7. The storage system according to claim 1, wherein the volume management unit is further configured to: determine whether the data included in the second specific partial storage area after deleting the specific data and the data included in the first specific partial storage area associated with the second specific partial storage area are identical; and set, when the data included in the second specific partial storage area after deleting the specific data and the data included in the first specific partial storage area is determined to be identical, a specific value to the physical storage area assigned to the second specific partial storage area in the storage device.

8. The storage system according to claim 1, wherein the first volume is an entity volume that stores the master data commonly used by one or more virtual machines, and the second volume is a clone volume that stores the difference data individually used in each virtual machine among the one or more virtual machines.

9. A storage management method comprising:

accepting a delete request for specific data included in a storage including a first volume providing a storage area for storing master data and a second volume providing a storage area for storing difference data including a difference from the master data in the first volume;

determining, when accepting the delete request for the specific data stored in a second specific partial storage area in the second volume, whether data in the second specific partial storage area after deleting the specific data and data stored in a first specific partial storage area in the first volume, associated with the second specific partial storage area are identical, the first specific partial storage area being a partial storage area in the first volume and the second specific partial storage are being a partial storage area in the second volume, and releasing, when the data in the second specific partial storage area after deleting the specific data and the data stored in the first specific partial storage area are determined to be identical, a physical storage area assigned to the second specific partial storage area, the physical storage area being included in a storage device allocated to the second volume, wherein the determining whether the data included in the second specific partial storage area after deleting the specific data and the data included in the first specific partial storage area are identical comprises:

generating a first check code for a difference area in the first specific partial storage area corresponding to the specific data to be deleted in the second specific partial storage area;

generating a second check code for a difference area in the second specific partial storage area corresponding to the specific data to be deleted;

comparing the first check code with the second check code;

in response to determining that the first check data is identical to the second check code, comparing the entire data included in the difference area in the second specific partial storage area with the entire data included in the difference area in the first specific partial storage area corresponding to the specific data.

10. A non-transitory computer-readable storage medium recorded with a computer program, the computer program causing a computer to execute:

processing of accepting a delete request for specific data included in a storage including a first volume providing a storage area for storing master data and a second volume providing a storage area for storing difference data including a difference from the master data in the first volume;

determining, when accepting the delete request for the specific data stored in a second specific partial storage area in the second volume, whether data in the second specific partial storage area after deleting the specific data and data stored in a first specific partial storage area in the first volume, associated with the second specific partial storage area are identical, the first specific partial storage area being a partial storage area in the first volume and the second specific partial storage are being a partial storage area in the second volume, and releasing, when the data in the second specific partial storage area after deleting the specific data and the data stored in the first specific partial storage area are determined to be identical, a physical storage area assigned to the second specific partial storage area, the physical storage area being included in a storage device allocated to the second volume, wherein the determining whether the data included in the second specific partial storage area after deleting the specific data and the data included in the first specific partial storage area are identical comprises:

generating a first check code for a difference area in the first specific partial storage area corresponding to the specific data to be deleted in the second specific partial storage area;

generating a second check code for a difference area in the second specific partial storage area corresponding to the specific data to be deleted;

comparing the first check code with the second check code;

in response to determining that the first check data is identical to the second check code, comparing the entire data included in the difference area in the second specific partial storage area with the entire data included in the difference area in the first specific partial storage area corresponding to the specific data.

* * * * *